United States Patent
Ota et al.

(10) Patent No.: US 9,200,126 B2
(45) Date of Patent: Dec. 1, 2015

(54) LAMINATED FILM

(75) Inventors: Kazuyoshi Ota, Shiga (JP); Masato Yanagibashi, Shiga (JP); Yasushi Takada, Shiga (JP); Yu Abe, Shiga (JP)

(73) Assignee: Toray Industries, Inc. (JP)

( * ) Notice: Subject to any disclaimer, the term of this patent is extended or adjusted under 35 U.S.C. 154(b) by 521 days.

(21) Appl. No.: 13/636,871

(22) PCT Filed: Mar. 2, 2011

(86) PCT No.: PCT/JP2011/054684
§ 371 (c)(1),
(2), (4) Date: Sep. 24, 2012

(87) PCT Pub. No.: WO2011/122209
PCT Pub. Date: Oct. 6, 2011

(65) Prior Publication Data
US 2013/0011613 A1    Jan. 10, 2013

(30) Foreign Application Priority Data

Mar. 30, 2010 (JP) ................................. 2010-077059
Nov. 17, 2010 (JP) ................................. 2010-256623

(51) Int. Cl.
| | | |
|---|---|---|
| D06N 7/04 | (2006.01) | |
| B32B 27/36 | (2006.01) | |
| B32B 27/30 | (2006.01) | |
| C08J 7/04 | (2006.01) | |

(52) U.S. Cl.
CPC .............. *C08J 7/047* (2013.01); *C08J 2367/02* (2013.01); *Y10T 428/24372* (2015.01); *Y10T 428/31511* (2015.04); *Y10T 428/31935* (2015.04)

(58) Field of Classification Search
None
See application file for complete search history.

(56) References Cited

U.S. PATENT DOCUMENTS

| | | | | |
|---|---|---|---|---|
| 4,089,997 A | * | 5/1978 | Van Paesschen et al. | 427/171 |
| 4,262,072 A | * | 4/1981 | Wendling et al. | 430/14 |
| 6,331,344 B1 | * | 12/2001 | Okazaki et al. | 428/141 |
| 2004/0028924 A1 | | 2/2004 | Kubota et al. | |
| 2004/0076844 A1 | | 4/2004 | Tojo et al. | |
| 2009/0002820 A1 | * | 1/2009 | Okano et al. | 359/483 |

FOREIGN PATENT DOCUMENTS

| | | |
|---|---|---|
| CN | 1087354 | 6/1994 |
| CN | 1048987 C | 2/2000 |
| CN | 1457297 | 11/2003 |
| CN | 1512934 | 7/2014 |
| JP | 2002-011841 A | 1/2002 |
| JP | 2002-127621 A | 5/2002 |
| JP | 2003-012841 A | 1/2003 |
| JP | 04-263937 A | 9/2004 |
| JP | 2006-281498 A | 10/2006 |
| JP | 2006-321165 A | 11/2006 |
| JP | 2008-179148 A | 8/2008 |
| JP | 2009-173911 A | 8/2009 |
| JP | 2010-143202 A | 7/2010 |

OTHER PUBLICATIONS

Chinese Official Action dated Mar. 4, 2014 along with an English translation from corresponding Chinese Application No. 201180016112.0.

Taiwanese Office Action of Feb. 9, 2015 to corresponding Taiwanese Patent Application No. 100110678 with translation.

* cited by examiner

*Primary Examiner* — David Sample
*Assistant Examiner* — Nicole T Gugliotta
(74) *Attorney, Agent, or Firm* — DLA Piper LLP (US)

(57) ABSTRACT

A laminated film includes a resin layer provided on at least one surface of a thermoplastic resin film substrate, wherein the resin layer comprises an acrylic-modified polyester whose acrylic resin component has a glass-transition temperature of not lower than 67° C. and a sugar alcohol and/or a sugar alcohol derivative; the mass ratio of the acrylic-modified polyester to the sugar alcohol and the sugar alcohol derivative (the mass of the acrylic-modified polyester/the total mass of the sugar alcohol and the sugar alcohol derivative) is from 75/25 to 97/3; the total content of the acrylic-modified polyester and the sugar alcohol and sugar alcohol derivative is 65% by mass or more based on the total resin layer; and the haze value of the laminated film is not more than 2.0%.

11 Claims, No Drawings

US 9,200,126 B2

LAMINATED FILM

RELATED APPLICATIONS

This is a §371 of International Application No. PCT/JP2011/054684, with an international filing date of Mar. 2, 2011 (WO 2011/122209 A1, published Oct. 6, 2011), which is based on Japanese Patent Application No. 2010-256623, filed Nov. 17, 2010 and Japanese Patent Application No. 2010-077059, filed Mar. 30, 2010, the subject matter of which are incorporated by reference.

TECHNICAL FIELD

This disclosure relates to a laminated film in which a resin layer is laminated on a thermoplastic resin film, and more particularly to a laminated film having a resin layer that is excellent in inhibition of oligomers that precipitate from a thermoplastic resin film upon heat treatment.

BACKGROUND

Thermoplastic resin films, particularly biaxially drawn polyester films, have excellent properties such as mechanical properties, electrical properties, dimensional stability, transparency, and chemical resistance, and therefore have been widely used as a substrate film in a number of applications such as magnetic recording materials and packaging materials. Especially in recent years, they are in increasing demand as various optical films including display materials related to flat-panel display. In such a flat-panel display, a plurality of optical films having various functions are laminated for use in most cases. Therefore, methods for providing a polyester film surface with adhesion property have hitherto been studied. In particular, formation of an adhesion resin layer by coating provides adhesion to various materials.

However, there have been cases where, although adhesion property to various resins has been obtained, for example, heat treatment in processing has caused precipitation of oligomers from a thermoplastic resin film, resulting in unsuitability for practical use as an end product due to whitening or film surface contamination. Therefore, laminating a coating film on a resin film surface in order to inhibit oligomers has hitherto been studied. For example, the method of providing a coating film using an acrylic-modified polyester Japanese Patent Publication Nos. 04-263937 A, 2003-012841 A and 2002-011841 A, the method of adding an additive such as a resin having a particular functional group, mineral oil, or a cross-linker to a resin layer Japanese Patent Publication Nos. 2006-281498 A and 2002-127621 A, and the method of providing adhesion property and heat resistance property by laminating a coating film comprising various binder resins and a cross-linker using the in-line coating method in which application is carried out during the process of producing a thermoplastic resin film Japanese Patent Publication Nos. 2010-143202 A, 2006-321165 A and 2008-179148 Δ have been proposed.

However, according to the method of providing an acrylic-modified polyester on a film surface as a resin layer as described in Japanese Patent Publication Nos. 04-263937 A, 2003-012841 A and 2002-011841 A, although the acrylic-modified polyester contains an acrylic component having a glass-transition temperature of not less than a certain temperature, defects and cracks occur in the resin layer when the resin layer is set, resulting in that sufficient oligomer-inhibiting effect cannot be obtained, and besides the transparency of a laminated film can be impaired. In particular, when providing an acrylic resin having a glass-transition temperature of more than 90° C. as a resin layer as described in Japanese Patent Publication Nos. 2010-143202 A, 2006-321165 A and 2008-179148 A, cracks occur in the resin layer during film formation, and therefore haze can increase to significantly decrease homogeneous film-formation. Further, according to the method using an additive such as mineral oil or a cross-linker as described in Japanese Patent Publication Nos. 2006-281498 A and 2002-127621 A, the additive itself can bleed out on a surface layer of a resin layer during the resin layer formation or over time after the film formation, causing, for example, whitening of the resin film and film surface contamination as well as oligomer precipitation.

Thus, it could be helpful to provide a resin film having an excellent transparency and inhibition of oligomer.

SUMMARY

We thus provide:

A laminated film comprising a resin layer provided on at least one surface of a thermoplastic resin film substrate, wherein the resin layer comprises an acrylic-modified polyester whose acrylic resin component has a glass-transition temperature of not lower than 67° C. and a sugar alcohol and/or a sugar alcohol derivative;

the mass ratio of the acrylic-modified polyester to the sugar alcohol and the sugar alcohol derivative (the mass of the acrylic-modified polyester/the total mass of the sugar alcohol and the sugar alcohol derivative) is from 75/25 to 97/3;

the total content of the acrylic-modified polyester and the sugar alcohol and sugar alcohol derivative is 65% by mass or more based on the total resin layer; and the haze value of the laminated film is not more than 2.0%.

The laminated film has not only excellent initial transparency, but also excellent inhibition of oligomer particularly after heat treatment and has a transparency-maintaining effect.

DETAILED DESCRIPTION

Our laminated film will now be described in detail.

We provide a laminated film in which a resin layer is laminated on at least one surface of a thermoplastic resin film as a substrate film, and the resin layer comprises an acrylic-modified polyester (A) whose acrylic resin component has a glass-transition temperature of not lower than 67° C. and a sugar alcohol (B1) and/or a sugar alcohol derivative (B2). If necessary, inorganic particles (D) and at least one compound (C) selected from the group consisting of an oxazoline-based compound, a carbodiimide-based compound, an epoxy-based compound, and a melamine-based compound can be used, and besides various additives such as slip agents and surfactants can be used to the extent that transparency and inhibition of oligomer are not impaired.

It is necessary that the laminated film have a haze of not more than 2.0%, and more preferably not more than 1.0%. If the haze is not more than 2.0%, when the laminated film is used as an optical film for, for example, display, for example, cloudiness of display can be prevented, and decrease in resolution can be prevented. Further, the laminated film can also be used as a transparent adhesion film that requires other thermal processing, and its use can be expanded also for versatile use.

The haze of not more than 2.0% can be achieved by controlling the ratio of the content of the acrylic-modified polyester (A) to the total content of the sugar alcohol (B1) and the sugar alcohol derivative (B2) in the resin layer above a certain value to thereby improve homogeneous film-formation of the acrylic-modified polyester in the resin layer and prevent crack generation. The details will be described below.

(1) Acrylic-Modified Polyester (A)

The acrylic-modified polyester (A) is one in which an acrylic resin component and a polyester resin component are mixed with and/or bound to each other and encompasses, for example, graft-type one and block-type one. Either of the acrylic resin component and the polyester resin component in the acrylic-modified polyester (A) may have a higher degree of copolymerization.

The acrylic-modified polyester resin (A) can be produced, for example, by adding a radical initiator to both ends of a polyester to allow polymerization of acrylic monomers, adding a radical initiator to side chains of a polyester to allow polymerization of acrylic monomers, or attaching hydroxyl groups to side chains of an acrylic resin to allow reaction with a polyester having an isocyanate group or a carboxyl group at its terminus.

The glass-transition temperature of the acrylic resin component of the acrylic-modified polyester (A) (hereinafter referred to as "Tg" for short) needs to be not lower than 67° C. and is preferably 90° C. or higher, more preferably 93° C. or higher, and particularly preferably 97° C. When Tg is not lower than 67° C., thermal molecular mobility of the acrylic resin component is inhibited, enhancing the effect of inhibiting oligomers that precipitates from the thermoplastic resin film as a substrate from exiting the laminated film. Further, the effect of oligomer inhibition can be ensured, and besides the bleed-out of the components contained in the resin layer and the blocking phenomenon where resin layers adhere to each other can be inhibited.

The acrylic resin component in the acrylic-modified polyester (A) preferably has a Tg of 90° C. or higher, more preferably 93° C. or higher, and particularly preferably 97° C. or higher. When the Tg is 90° C. or higher, the hardness of the resin layer can be further enhanced to form a strong resin layer, which prevents exposure of the thermoplastic film on the surface due to abrasion or flaws of the resin layer, whereby the effect of oligomer inhibition can be more stably maintained. The Tg of the acrylic resin component is preferably not higher than 135° C. When the Tg of the acrylic resin component is higher than 135° C., cracks can occur in the resin layer during film formation. As a result, the haze can be more than 2.0%, and the effect of oligomer inhibition can be reduced.

The Tg of the acrylic resin component can be calculated by substituting the Tg of single polymers (mass average molecular weight: not less than 2000) of each of the alkyl methacrylate, alkyl acrylate, and epoxy-containing acrylic monomer described below into known Fox's approximation (1).

$$1/Tg = W_1/Tg_1 + W_2/Tg_2 \ldots + W_n/Tg_n \quad (1)$$

wherein

Tg: Tg of copolymer (K)

$Tg_1, Tg_2, Tg_n$: Tg of single polymers of each acrylic component (K)

$W_1, W_2, W_n$: mass fraction of each component ($W_1 + W_2 + \ldots + W_n = 1$).

The mass ratio of the acrylic resin component to the polyester resin component (the mass of the acrylic resin component/the mass of the polyester resin component) in the acrylic-modified polyester (A) is preferably from 30/70 to 90/10. The lower limit of the mass ratio is more preferably 40/60 or more. The upper limit of the mass ratio is more preferably 70/30 or less. When the mass ratio of the acrylic resin component to the polyester resin component is from 30/70 to 90/10, the oligomer-inhibiting effect due to the acrylic resin component can be ensured, resulting in good resin layer formation by the polyester resin and good adhesion property of the resin layer to the thermoplastic resin film.

The acrylic resin component constituting the acrylic-modified polyester (A) preferably contains alkyl methacrylate and/or alkyl acrylate in an amount from 50% by mass to 97% by mass based on the total acrylic resin component and epoxy-containing acrylic monomer in an amount from 3% by mass to 50% by mass based on the total acrylic resin component. The content of alkyl methacrylate and/or alkyl acrylate is more preferably from 80% by mass to 95% by mass based on the total acrylic resin component. The content of the epoxy-containing acrylic monomer is more preferably from 5% by mass to 20% by mass based on the total acrylic resin component. "The content of alkyl methacrylate and/or alkyl acrylate" refers to the content of alkyl methacrylate when the acrylic-modified polyester (A) does not contain alkyl methacrylate; it refers to the content of alkyl acrylate when the acrylic-modified polyester (A) does not contain alkyl acrylate; and it refers to the total content of both when the acrylic-modified polyester (A) comprises both of alkyl methacrylate and alkyl acrylate.

When alkyl methacrylate and/or alkyl acrylate are contained in an amount of not less than 50% by mass based on the total acrylic resin component, the acrylic-modified polyester is readily polymerized, and when contained in an amount of not more than 97% by mass, the effect of epoxy-containing acrylic monomer described below can be ensured. When epoxy-containing acrylic monomer is contained in an amount of not less than 3% by mass based on the total acrylic resin component, the crosslink density of the acrylic resin component is maintained, whereby wear of the resin layer and thermal deformation of the resin layer during thermal processing can be prevented, and when contained in an amount of not more than 50% by mass, the effect of alkyl methacrylate and/or alkyl acrylate described above can be ensured.

As alkyl methacrylate and/or alkyl acrylate, methacryl acid, methyl methacrylate, ethyl methacrylate, isopropyl methacrylate, n-butyl methacrylate, isobutyl methacrylate, n-hexyl methacrylate, lauryl methacrylate, 2-hydroxyethyl methacrylate, hydroxypropyl methacrylate, acrylic acid, methyl acrylate, ethyl acrylate, isopropyl acrylate, n-butyl acrylate, isobutyl acrylate, n-hexyl acrylate, lauryl acrylate, 2-ethylhexyl acrylate, 2-hydroxyethyl acrylate, hydroxypropyl acrylate, maleic acid, itaconic acid, acrylamide, N-methylolacrylamide, diacetone acrylamide, and the like are preferably used. These may be used alone or in combination of two or more.

Preferred examples of the epoxy group-containing acrylic monomer include glycidyl acrylate, glycidyl methacrylate, and allyl glycidyl ether. These may be used alone or in combination of two or more.

The polyester resin component constituting the acrylic-modified polyester is one having an ester bond on the main chain or side chain and is composed of a dicarboxylic acid component and a diol component. As a carboxylic acid component constituting the polyester resin, an aromatic, aliphatic, or alicyclic dicarboxylic acid and tri- or more polycarboxylic acid can be used. As an aromatic dicarboxylic acid, terephthalic acid, isophthalic acid, orthophthalic acid, phthalic acid, 2,5-dimethyl terephthalic acid, 5-sodium sulfoisophthalic acid, 1,4-naphthalene dicarboxylic acid, and the like, and ester-forming derivatives thereof can be used.

As a glycol component of the polyester resin, ethylene glycol, diethylene glycol, polyethylene glycol, propylene glycol, polypropylene glycol, 1,3-propanediol, 1,3-butanediol, 1,4-butanediol, neopentyl glycol, and the like can be used.

In cases where the polyester resin component is dissolved or dispersed in an aqueous solvent to be used as an aqueous resin composition, it is preferable to copolymerize a compound comprising a sulfonate group and a compound comprising a carboxylate group in order to facilitate water solubilization or water dispersion of the polyester resin component.

Examples of the compound comprising a carboxylate group include, for example, trimellitic acid, trimellitic anhydride, pyromellitic acid, pyromellitic dianhydride, 4-methylcyclohexene-1,2,3-tricarboxylic acid, trimesic acid, 1,2,3,4-butanetetracarboxylic acid, and 1,2,3,4-pentanetetracarboxylic acid, or, for example, alkali metal salts, alkaline earth metal salts, and ammonium salts thereof, but are not limited thereto.

Examples of the compound comprising a sulfonate group that can be used include, for example, sulfo-terephthalic acid, 5-sulfoisophthalic acid, 5-sodium sulfoisophthalic acid, and 4-sulfoisophthalic acid, or alkali metal salts, alkaline earth metal salts, and ammonium salts thereof, but are not limited thereto.

The acrylic-modified polyester used in the resin layer can be produced by the following production method. First, a polyester resin component is produced as described below. For example, it can be produced, for example, by directly bringing a dicarboxylic acid component and a glycol component into esterification reaction, or by the production method comprising the first step of bringing a dicarboxylic acid component and a glycol component into transesterification reaction and the second step of bringing the reaction product of the first step into polycondensation reaction. In this method, for example, alkali metal, alkaline earth metal, manganese, cobalt, zinc, antimony, germanium, titanium compound, and the like can be used as a reaction catalyst.

Next, the polyester resin component is dispersed in a solvent, and for dispersion particularly in an aqueous solvent, the polyester resin is dissolved or dispersed under stirring in an aqueous solution of an alkaline compound such as aqueous ammonia, sodium hydroxide, potassium hydroxide, various amines, or the like. In this case, water-soluble organic solvents such as methanol, ethanol, isopropanol, butyl cellosolve, and ethyl cellosolve may be used in combination.

Then, to produce an acrylic-modified polyester, a polymerization initiator and, if necessary, an emulsifying dispersant and the like are added into a dispersion of the polyester resin component, and an acrylic resin component is slowly added at a constant temperature, after which the resultant is allowed to react for several hours to thereby produce a dispersion of the acrylic-modified polyester. The dispersion obtained is a mixture of an acrylic-modified polyester, a polyester resin component, and an acrylic resin component.

The polymerization initiator is not particularly limited, and a common radical polymerization initiator, for example, water-soluble peroxide such as potassium persulfate, ammonium persulfate, or hydrogen peroxide; oil-soluble peroxide such as benzoyl peroxide or t-butyl hydroperoxide; or an azo compound such as azodiisobutyronitrile can be used.

(2) Sugar Alcohol (B1), Sugar Alcohol Derivative (B2)

The sugar is a general term of carbohydrates having three or more carbon atoms represented by the molecular formula $C_mH_nO_p$ (m, n, and p: integer of 3 or more; and n: p×2) and those having in their molecule a carbonyl group(s) such as an aldehyde group(s) or a ketone group(s). The sugar alcohol is an alcohol having one or more hydroxyl groups obtained by reducing the carbonyl group of a sugar molecule. For a sugar molecule having two or more carbonyl groups, as long as at least one or more carbonyl groups are reduced and the molecule has one or more hydroxyl groups, it shall be the sugar alcohol even though the other carbonyl groups remain unreduced.

A sugar alcohol derivative refers to a compound in which a portion of hydroxyl groups is in the form of a salt or a compound in which a portion of hydroxyl groups has reacted with other functional groups in a sugar alcohol having two or more hydroxyl groups, provided that it is necessary to have at least one or more hydroxyl groups.

Although the sugar alcohol and the sugar alcohol derivative is not particularly restricted to be of chain structure or of cyclic structure, it is preferably one having a boiling point as a simple substance of 170° C. or higher. By using one having a boiling point as a simple substance of 170° C. or higher, homogeneous film-formation of an acrylic-modified polyester in a resin layer can be improved in the process of forming the resin layer on a laminated film, which prevents crack generation to thereby suppress the increase of a haze value. They are stably present in the resin layer not only when drying a solvent in a resin composition and during heat treatment to complete crystal orientation of a thermoplastic resin film but also stably present in the resin layer despite the change over time after forming the resin layer and the heat treatment, and can express the oligomer-inhibiting effect. Specific examples of the sugar alcohol include glycerin, erythritol, threitol, arabinitol, xylitol, ribitol, iditol, galactitol, glucitol, mannitol, volemitol, perseitol, and inositol. Examples of the sugar alcohol derivative include derivatives of these sugar alcohols. These may be used alone, or a mixture of two or more thereof may be used. Among them, glycerin, xylitol, glucitol, mannitol, and erythritol are suitable because of its industrial availability.

(3) The Content of Acrylic-Modified Polyester (A), and of Sugar Alcohol (B1) and Sugar Alcohol Derivative (B2)

The mass ratio of the acrylic-modified polyester (A) to the sugar alcohol (B1) and sugar alcohol derivative (B2) contained in the resin layer (the mass of A/the total mass of B1 and B2; hereinafter referred to as (A/(B1+B2))) is in the range of 75/25 to 97/3. The lower limit of the mass ratio is preferably 85/15 or more and more preferably 90/10 or more. The upper limit of the mass ratio is preferably 95/5 or less and more preferably 93/7 or less. Although described as "the sugar alcohol (B1) and sugar alcohol derivative (B2)", this does not mean that both of the sugar alcohol (B1) and the sugar alcohol derivative (B2) are necessarily contained in the resin layer. Also, in the case where the sugar alcohol (B1) is not contained as well as in the case where the sugar alcohol derivative (B2) is not contained in the resin layer, such a description is used. When the ratio of the acrylic-modified polyester (A) is not less than 0.75, a stable and uniform resin layer can be formed on a thermoplastic resin film, and besides the desired oligomer-inhibiting effect can be sufficiently expressed. When the ratio of the total of the sugar alcohol (B1) and sugar alcohol derivative (B2) is not less than 0.03, evaporation of a solvent during resin layer formation and crack generation of the acrylic-modified polyester (A) caused by heat treatment described below can be prevented. Particularly in the in-line coating method described below, cracks in the resin layer that occur during the drawing process of a thermoplastic resin film are prevented, whereby a stable and uniform resin layer can be formed on the thermoplastic resin film, and the haze of the laminated film can be no more than 2.0%; besides the desired oligomer-inhibiting effect can be sufficiently expressed.

The total content of the acrylic-modified polyester (A) and the sugar alcohol (B1) and sugar alcohol derivative (B2) is 65% by mass or more, more preferably 75% by mass or more, and more preferably 90% by mass or more, based on the total resin layer. Although described as "the total content of the acrylic-modified polyester (A) and the sugar alcohol (B1) and sugar alcohol derivative (B2)", this does not mean that both of the sugar alcohol (B1) and the sugar alcohol derivative (B2) are necessarily contained in the resin layer. Also, in the case where the sugar alcohol (B1) is not contained as well as in the case where the sugar alcohol derivative (B2) is not contained in the resin layer, such a description is used. When the content is 65% by mass or more based on the total resin layer, the desired oligomer-inhibiting effect due to the acrylic-modified polyester (A) and the sugar alcohol (B1) and sugar alcohol derivative (B2) can be expressed.

(4) Inorganic Particles (D)

Preferred examples of the inorganic particles include silica, colloidal silica, alumina, kaolin, talc, mica, calcium carbonate, barium sulfate, carbon black, zeolite, titanium oxide, fine particles composed of various metals or oxides thereof, and the like. Silica, colloidal silica, and alumina are preferred particularly in terms of high hardness and heat resistance property. By using inorganic particles, smoothness of the resin layer can be improved to prevent the degradation of the resin layer due to the friction between resin layers, and the oligomer-inhibiting effect can be maintained; besides, at the pressure test described below or when laminated films such as a laminated film stored in the form of a roll are laminated on each other and pressure is put thereon, the resin layer can be protected from deformation and rupture due to the pressure, and the effect of inhibiting oligomers from the resin layer after the pressurization can be maintained.

The number average particle size of the inorganic particles contained in the resin layer is determined by the peak position in a graph of particle size distribution (graph of frequency distribution) that represents the frequency of the particle size of the inorganic particles contained in the resin layer. Even if inorganic particle groups having a different number-average particle size are contained in the resin layer, the value of each number-average particle size can be determined by the peak position in a graph of particle size distribution. Taking the thickness of the resin layer as d, the highest frequency distribution peak (hereinafter referred to as the first peak) among the peaks in the particle-size distribution of inorganic particles is preferably in the range of particle size 1.05 d to 4.50 d. In other words, the number-average particle size of the inorganic particle group having the most particle number among the inorganic particle groups having a different number-average particle size contained in the resin layer is preferably in the range of particle size 1.05 d to 4.50 d. The lower limit of the first peak position is more preferably 2.00 d or more. The upper limit of the first peak position is more preferably 4.00 d or less. The method of measuring resin layer thickness d and particle-size distribution will be described below. When the first peak position is not less than 1.05 d, inorganic particles protrude from a resin layer surface, whereby a space is provided between laminated films when the laminated films are in the form of a roll or laminated on each other. As a result, deformation and rupture of the resin layer due to the pressure can be prevented, and an excellent oligomer-inhibiting effect can be maintained. When the first peak position is not more than 4.50 d, falling off of the inorganic particles from the resin layer can be prevented.

Further, at least one of the frequency distribution peaks other than the first peak (hereinafter referred to as other peaks) is preferably in the range of particle size 1.05 d to 4.50 d. In other words, the number-average particle size of at least one inorganic particle group other than the inorganic particle group having the most particle number among the inorganic particle groups having a different number-average particle size contained in the resin layer is preferably in the range of particle size 1.05 d to 4.50 d. The lower limit of the other peak position is more preferably 2.00 d or more. The upper limit of the other peak position is more preferably 4.00 d or less. When the other peaks are also in the range of particle size 1.05 d to 4.50 d, even if pressure is applied locally to the space between laminated films provided by the inorganic particle group having the most particle number, other inorganic particle groups supportingly maintain the space, and direct contact between the laminated films can be prevented.

Other peaks in the range of particle size 1.05 d to 4.50 d are preferably the second highest frequency distribution peak among the peaks in the particle-size distribution. In other words, the number-average particle size of the inorganic particle group having the second most particle number among the inorganic particle groups having a different number-average particle size contained in the resin layer is preferably in the range of particle size 1.05 d to 4.50 d. The protrusion of the inorganic particle group having the second most particle number from the resin layer allows the most effective support to the space between laminated films when pressure is applied locally as mentioned above.

In the case where a plurality of peaks having the same peak height of the particle-size distribution of inorganic particles is present, peaks are numbered in order of decreasing particle size. This is because the effect of smoothness and pressure resistance is exerted preferentially on larger particles against friction arising between laminated films and pressure. Specifically, for example, in the case where two highest peaks are present, one having larger particle size is the first peak, and one having smaller particle size is the second peak. For example, in the case where two second highest peaks are present, one having larger particle size is the second peak, and one having smaller particle size is the third peak.

The total mass of the inorganic particles contained in the resin layer is preferably from 0.2% by mass to 4.0% by mass based on the total mass of the resin layer. The lower limit of the content of the inorganic particles is more preferably 1.0% by mass or more. The upper limit the content of the inorganic particles is more preferably 3.0% by mass or less. When the content is not less than 0.2% by mass, uniform space can be provided between laminated films when the laminated film are in the form of a roll or laminated on each other. When the content is not more than 4.0% by mass, the haze value of the laminated film can be no more than 2.0%.

(5) Fluorochemical Surfactant (E)

The fluorochemical surfactant is not particularly limited as long as it comprises at least one molecule having a fluorocarbon chain, which is obtained by substituting fluorine atoms for hydrogen atoms in the alkyl chain in a molecule, and a static surface tension of not more than 40 mN/m. As such a fluorochemical surfactant, sulfonate, carboxylate, and ethylene oxide adduct having a perfluoroalkyl chain are preferred in terms of surface tension-reducing capability and a leveling effect produced when a resin composition is applied, and, specifically, for example, those having a $C_9F_{17}O$-group or a $C_6F_{11}O$-group at both terminals or those having them at one terminal represented by α-perfluorononenyloxy-ω-perfluorononenylpolyethylene oxide and α-perfluorononenyloxy-ω-methyl polyethylene oxide are preferred. By using a fluorochemical surfactant, at the pressure test described below or when laminated films such as laminated films stored in the form of a roll are laminated on each other and pressure is put thereon, still better oligomer-inhibiting ability can be maintained with respect to the oligomer-inhibiting effect of inorganic particles. The mechanism of the effect of a fluorochemical surfactant on pressure, although not clearly known, is presumably due to (i) to (iii) below.

(i) The high surface tension-reducing effect of a fluorochemical surfactant improves the leveling property of a resin layer, and particle parts protruding from the resin layer appear more clearly from the resin layer surface. As a result, a space between laminated films is more clearly formed when the laminated films are in the form of a roll or laminated on each other.

(ii) Inorganic particles and a binder resin of a resin layer have a different surface energy. Therefore, a gap is formed between the inorganic particles and the binder resin, and oligomers can precipitate from the gap. By adding a fluorine surfactant, repulsive force between the inorganic particles and the binder resin is reduced, and the gap becomes smaller, whereby precipitation of oligomers can be inhibited.

(iii) A fluorocarbon chain is rigid and inflexible and easily arranged on a resin layer surface, and therefore it is able to exert excellent resistance to pressure to enhance the hardness on the resin layer surface.

The content of the fluorochemical surfactant is preferably from 0.01% by mass to 0.30% by mass based on the total mass of the resin composition, which is paint that forms a resin layer. The lower limit of the content is more preferably 0.02% by mass or more. The upper limit of the content is more preferably 0.20% by mass or less. When the content is not less than 0.01% by mass, a surface tension-reducing effect can be exerted on the resin composition. When the content is not more than 0.30% by mass, excessive precipitation of the surfactant on a surface layer of the resin layer is prevented when the resin layer is formed, and the haze value of a laminated film can be no more than 2.0%.

(6) At Least One Compound (C) Selected from the Group Consisting of Oxazoline-Based Compound, Carbodiimide-Based Compound, Epoxy-Based Compound, and Melamine-Based Compound In a resin layer, the acrylic-modified polyester (A) is preferably cross-linked by at least one compound (C) selected from the group consisting of an oxazoline-based compound, a carbodiimide-based compound, an epoxy-based compound, and a melamine-based compound.

Although the oxazoline-based compound is not particularly limited as long as it has at least one oxazoline group or oxazine group in one molecule, preferred is a high-molecular compound obtained by polymerizing addition polymerizable oxazoline group-containing monomers alone or with other monomers. This is because, by using a high-molecular oxazoline compound, adhesion property and adhesion property of resistance to moist heat, for example, to various inks and hard coat agents, flexibility, toughness, water-resistant property, and solvent resistance as well as oligomer-inhibiting effect of the resin layer are improved when the resin layer is provided on a thermoplastic resin film to produce a laminated film.

Examples of addition polymerizable oxazoline group-containing monomers include 2-vinyl-2-oxazoline, 2-vinyl-4-methyl-2-oxazoline, 2-vinyl-5-methyl-2-oxazoline, 2-isopropenyl-2-oxazoline, 2-isopropenyl-4-methyl-2-oxazoline, and 2-isopropenyl-5-ethyl-2-oxazoline. These may be used alone, or a mixture of two or more thereof may be used. Among them, 2-isopropenyl-2-oxazoline is suitable because of its industrial availability. Other monomers are not limited as long as they are monomers that are copolymerizable with addition polymerizable oxazoline group-containing monomers, and examples thereof include (meth)acrylic acid esters such as alkyl acrylate and alkyl methacrylate (examples of alkyl groups include methyl, ethyl, n-propyl, isopropyl, n-butyl, isobutyl, t-butyl, 2-ethylhexyl, and cyclohexyl); unsaturated carboxylic acids such as acrylic acid, methacryl acid, itaconic acid, maleic acid, fumaric acid, crotonic acid, styrene sulfonic acid, and salts thereof (for example, sodium salt, potassium salt, ammonium salt, and tertiary amine salt); unsaturated nitriles such as acrylonitrile and methacrylonitrile; unsaturated amides such as acrylamide, methacrylamide, N-alkylacrylamide, N-alkylmethacrylamide, N,N-dialkylacrylamide, N,N-dialkyl methacrylate (examples of alkyl groups include methyl, ethyl, n-propyl, isopropyl, n-butyl, isobutyl, t-butyl, 2-ethylhexyl, and cyclohexyl); vinyl esters such as vinyl acetate, vinyl propionate, and those obtained by adding polyalkylene oxide to an ester moiety of acrylic acid or methacryl acid; vinyl ethers such as methyl vinyl ether and ethyl vinyl ether; α-olefins such as ethylene and propylene; halogen-containing α,β-unsaturated monomers such as vinyl chloride, vinylidene chloride, and vinyl fluoride; α,β-unsaturated aromatic monomers such as styrene and α-methylstyrene; and the like. These monomers may be used alone or in combination of two or more.

Although the carbodiimide-based compound is not particularly limited as long as it has, for example, at least one carbodiimide structure represented by general formula (2) below in one molecule, particularly preferred is a polycarbodiimide compound having two or more in one molecule in terms, for example, of adhesion property of resistance to moist heat. In particular, a high-molecular isocyanate-based compound having a plurality of carbodiimide groups at the terminals or in a side chain of a polymer such as a polyester resin and an acrylic resin can be preferably used, because adhesion property and adhesion property of resistance to moist heat, for example, to various inks and hard coat agents, flexibility, and toughness as well as oligomer-inhibiting effect of the resin layer are improved when the resin layer is provided on a thermoplastic resin film to produce a laminated film.

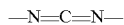

$$-N{=}C{=}N- \quad (2)$$

A carbodiimide-based compound can be produced by applying known techniques and is generally obtained by polycondensation of a diisocyanate-based compound in the presence of a catalyst. As a diisocyanate-based compound, which is a starting material of a polycarbodiimide compound, aromatic, aliphatic, alicyclic diisocyanate, and the like can be used, and, specifically, tolylene diisocyanate, xylene diisocyanate, diphenylmethane diisocyanate, hexamethylene diisocyanate, cyclohexane diisocyanate, isophorone diisocyanate, dicyclohexyl diisocyanate, and the like can be used. Further, to improve the water solubility and water dispersibility of the polycarbodiimide compound, a surfactant may be added, or a hydrophilic monomer such as polyalkylene oxide, a quaternary ammonium salt of dialkylamino alcohol, and hydroxyalkyl sulfonate may be added or used without eliminating the effects of this disclosure.

The epoxy-based compound is not particularly limited as long as it has at least one or more epoxy groups in one molecule, and a monoepoxy compound, a diepoxy compound, a polyepoxy compound, a modified epoxy compound, and the like can be used. In particular, a bi- or more functional epoxy-based compound is preferably used, and it can preferably be used because adhesion property and adhesion property of resistance to moist heat, for example, to various inks and hard coat agents, toughness, water-resistant property, and solvent resistance as well as oligomer-inhibiting effect of the resin layer are improved when the resin layer is provided on a thermoplastic resin film to produce a laminated film. As an epoxy-based compound, specifically, for example, sorbitol polyglycidyl ether, polyglycerol polyglycidyl ether, diglycerol polyglycidyl ether, polyethylene glycol diglycidyl ether, fatty acid-modified glycidyl, glycidyl ether, glycidyl methacrylate, and the like can be used.

As a melamine-based compound, although this is not a limited example, a compound that has been etherified by dehydration condensation reaction of a methylol melamine derivative obtained by condensation of melamine with formaldehyde and a lower alcohol such as methyl alcohol, ethyl alcohol, or isopropyl alcohol is preferred in terms of hydrophilization, and it can be preferably used because adhesion property and adhesion property of resistance to moist heat, for example, to various inks and hard coat agents, flexibility, toughness, and solvent resistance as well as oligomer-inhibiting effect of the resin layer are improved when the resin layer is provided on a thermoplastic resin film to produce a laminated film. Examples of methylolated melamine derivatives include monomethylol melamine, dimethylol melamine, trimethylol melamine, tetramethylol melamine, pentamethylol melamine, hexamethylol melamine, and the like.

At least one compound (C) selected from the group consisting of an oxazoline-based compound, a carbodiimide-based compound, an epoxy-based compound, and a melamine-based compound (hereinafter referred to as the compound (C) for short) can be used in any amount as long as the effect of the acrylic-modified polyester (A), the sugar alcohol (B1), and the sugar alcohol derivative (B2) is not impaired, but preferably 5 to 50 parts by mass and more preferably 10 to 30 parts by mass, based on 100 parts by mass of the total of the acrylic-modified polyester (A) and the sugar alcohol (B1) and sugar alcohol derivative (B2). Although described as "100 parts by mass of the total of the acrylic-modified polyester (A) and the sugar alcohol (B1) and sugar alcohol derivative (B2)", this does not mean that both of the sugar alcohol (B1) and the sugar alcohol derivative (B2) are necessarily contained in the resin layer. Also, in the case where the sugar alcohol (B1) is not contained as well as in the case where the sugar alcohol derivative (B2) is not contained in the resin layer, such a description is used. When the amount is not less than 5 parts by mass, the effect of the compound (C) is expressed, and when the amount is not more than 50 parts by mass, the effect of the acrylic-modified polyester (A) and the sugar alcohol (B1) and sugar alcohol derivative (B2) in the resin layer can be maintained. In addition to the compound (C), other compounds such as an aziridine compound, an amide-epoxy compound, a titanate coupling agent such as titanium chelate, a methylolated or alkylolated urea-based compound, and an acrylamide-based compound can optionally be used.

In the resin layer, the acrylic-modified polyester (A) is preferably cross-linked by the compound (C). Although the mode of cross-linking is preferably cross-linking reaction between hydrophilic groups such as carboxylic acid group, hydroxyl group, and amino group of the acrylic-modified polyester (A) and reactive groups of the compound (C), it is not necessary that all the hydrophilic groups of the acrylic-modified polyester (A) be cross-linked to the compound (C): one portion may react with the moiety other than hydroxyl group of the acrylic-modified polyester (A); in another portion, one and/or more compounds (C) may be cross-linked to each other in the resin layer; and in the other portion, the compound (C) may be present without cross-linking. If the compound (C) has a cross-linked structure, even if in part, with the acrylic-modified polyester (A) in the resin layer, adhesion property and adhesion property of resistance to moist heat, flexibility, toughness, water-resistant property, solvent resistance, and the like as well as oligomer-inhibiting effect of the resin layer are improved, and it can preferably be used.

(7) Thermoplastic Resin Film

In the laminated film, the thermoplastic resin film used as a substrate film is a general term of films that are obtained by using a thermoplastic resin and melt or soften by heat. Examples of the thermoplastic resin include polyester resins, polyolefin resins such as polypropylene resins and polyethylene films, polylactic acid resins, polycarbonate resins, acrylic resins such as polymethacrylate resins and polystyrene resins, polyamide resins such as nylon resins, polyvinyl chloride resins, polyurethane resins, fluororesins, polyphenylene resins, and the like. The thermoplastic resin used in the thermoplastic resin film may be a monopolymer or copolymer. Further, a plurality of resins may be used.

Representative examples of the thermoplastic resin film using these thermoplastic resins include polyester films, polyolefin films such as polypropylene films and polyethylene films, polylactic acid films, polycarbonate films, acrylic films such as polymethacrylate films and polystyrene films, polyamide films such as nylon, polyvinyl chloride films, polyurethane films, fluorine-based films, polyphenylene sulfide films, and the like.

The resin layer, considering that it has a high effect of oligomer inhibition, is preferably applied to a thermoplastic resin film prone to oligomer generation. In view of this, polyester films or polyethylene films are preferred as a substrate film. In particular, polyester films having also mechanical strength and versatility are preferred.

Thus, the polyester resin constituting a polyester film particularly suitably used as a thermoplastic resin film will now be described in detail.

First, polyester is a general term of polymers having ester bonds as a main bonding chain of the main chain, and those having as a main component at least one component selected from ethylene terephthalate, propylene terephthalate, ethylene-2,6-naphthalate, butylene terephthalate, propylene-2,6-naphthalate, ethylene-α,β-bis(2-chlorophenoxy)ethane-4,4'-dicarboxylate, and the like can preferably be used. Polyethylene terephthalate is preferably used as a thermoplastic resin used in the thermoplastic resin film. In the case where heat or shrinkage stress acts on the thermoplastic resin film, polyethylene-2,6-naphthalate, which has excellent heat resistance property and rigidity, is particularly preferred.

A polyester film using the above-described polyester is preferably one that is biaxially oriented. A biaxially oriented polyester film generally refers to those which are obtained by drawing an undrawn polyester sheet or film about 2.5- to 5-fold each in the longitudinal direction and in the width direction perpendicular to the longitudinal direction, and then applying a heat treatment to complete crystal orientation, and those which show biaxial orientation pattern in wide-angle X-ray diffraction. If the thermoplastic resin film is not biaxially oriented, the thermoplastic resin film will have insufficient thermal stability, particularly dimensional stability, and mechanical strength and poor planarity, which is not preferred.

Further, various additives such as antioxidants, heat stabilizers, weathering stabilizers, ultraviolet absorbers, organic slip agents, pigments, dyes, organic or inorganic fine particles, fillers, antistatic agents, and nucleus formation agents may be added into the thermoplastic resin film to the extent that the properties thereof are not deteriorated.

Although the thickness of the thermoplastic resin film is not particularly limited and appropriately selected depending on the application and type, in terms, for example, of mechanical strength and handleability, it is generally preferably 10 to 500 μm, more preferably 38 to 250 μm, and most preferably 75 to 150 μm. The thermoplastic resin film may be a composite film obtained by coextrusion or may be a film obtained by laminating the obtained films each other by various methods.

(8) Method of Forming Resin Layer

A resin layer can be formed on a thermoplastic resin film by applying the resin composition containing the acrylic-modified polyester (A) and the sugar alcohol (B1) and/or sugar alcohol derivative (B2) described above onto the thermoplastic resin film and drying a solvent as required. This resin composition is a resin composition comprising an acrylic-modified polyester (A) whose acrylic resin component has a glass-transition temperature of not lower than 67° C. and a sugar alcohol (B1) and/or a sugar alcohol derivative (B2), wherein the mass ratio of the content of the acrylic-modified polyester (A) to the total content of the sugar alcohol (B1) and sugar alcohol derivative (B2) (A/(B1+B2)) is from 75/25 to 97/3, and the total content of the acrylic-modified polyester (A) and the sugar alcohol (B1) and sugar alcohol derivative (B2) based on the solid content of the resin composition is 65% by mass or more.

An aqueous solvent (F) is preferably used as a solvent. The aqueous solvent is used not only because it allows the prevention of rapid evaporation of the solvent during a drying process and formation of a uniform composition layer but also because it is excellent in terms of environmental load.

The aqueous solvent (F) as used herein refers to water or a mixture of water and a water-soluble organic solvent such as alcohols such as methanol, ethanol, isopropyl alcohol, and butanol; ketones such as acetone and methyl ethyl ketone; and glycols such as ethylene glycol, diethylene glycol, and propylene glycol at any ratio. The aqueous solvent is used not only because it allows the prevention of rapid evaporation of the solvent during a drying process and formation of a uniform composition layer but also because it is excellent in terms of environmental load.

As a method of applying the resin composition to the thermoplastic resin film, either of the in-line coating method or the off coating method can be used, but the in-line coating method is preferred.

The in-line coating method is a method in which application is carried out during the process of producing a thermoplastic resin film. Specifically, it refers to a method in which application is carried out at any time during the process in which a thermoplastic resin is melt-extruded, biaxially drawn, heat-treated, and wound up, and, in general, the resin composition is applied to any film of an undrawn (nonoriented) thermoplastic resin film in a substantially amorphous state obtained by melt extrusion and the following rapid cooling (A film), an uniaxially drawn (uniaxially oriented) thermoplastic resin film that has been drawn in the longitudinal direction thereafter (B film), or a biaxially drawn (biaxially oriented) thermoplastic resin film before heat treatment that has been drawn further in the width direction (C film).

It is preferable to employ the method in which a resin composition is applied to either thermoplastic resin film of the above-described A film or B film before completion of crystal orientation, and then the thermoplastic resin film is uniaxially or biaxially drawn and subjected to a heat treatment at a temperature higher than the boiling point of a solvent to complete crystal orientation of the thermoplastic resin film and also provide a resin layer. This method has a merit in production cost because formation of a thermoplastic resin film and application and drying of a resin composition (i.e., formation of a resin layer) can be simultaneously carried out. In addition, it is easy to reduce the thickness of the resin layer because the drawing is carried out after the application.

In particular, the method in which a composition for coating is applied to the film uniaxially drawn in the longitudinal direction (B film), which is then drawn in the width direction and subjected to a heat treatment is excellent. This is because the method involves one less drawing step than the method in which biaxial drawing is performed after application to an undrawn film, and therefore defects and cracks of the resin layer due to the drawing do not readily occur, whereby a composition layer having an excellent transparency and smoothness can be formed.

On the other hand, the off-line coating method is a method in which a resin composition is applied in a process different from the film-forming process to a film obtained after the A film described above has been uniaxially or biaxially drawn and subjected to a heat treatment to complete the crystal orientation of a thermoplastic resin film or to the A film.

The resin layer is preferably provided by the in-line coating method in terms of the various advantages described above.

Thus, the best method of forming a resin layer is a method in which a resin layer is formed by applying a resin composition using the aqueous solvent (F) onto a thermoplastic resin film using the in-line coating method and drying the resultant. More preferred is a method in which the B film after uniaxial drawing is in-line coated with a resin composition. Further, the solid content concentration of the resin composition is preferably not more than 10% by mass. When the solid content concentration is not more than 10% by mass, the resin composition can be provided with good application properties, and a laminated film provided with a transparent and uniform composition layer can be produced.

(9) Method of Preparing Resin Composition Using Aqueous Solvent (F)

A resin composition using the aqueous solvent (F) can be prepared by mixing the acrylic-modified polyester (A) that has been water-dispersed or water-solubilized as required, an aqueous compound of the sugar alcohol (B1) and/or sugar alcohol derivative (B2), and the aqueous solvent (F) in any order at a desired mass ratio and stirring the resulting mixture. Then, it can be prepared by adding, if necessary, the compound (C) to the resin composition described above in any order at a desired mass ratio and stirring the resulting mixture.

The mixing and stirring can be carried out by shaking a container by hand, using a magnetic stirrer or a stirring blade, ultrasonic irradiation, or vibrational dispersion. In addition, various additives such as slip agents, inorganic particles, organic particles, surfactants, and antioxidants may be added as required to the extent that the properties of the resin layer provided by the resin composition are not deteriorated.

(10) Application Method

As a method of applying a resin composition to a thermoplastic resin film, for example, any known application methods such as the bar coating method, the reverse coating method, the gravure coating method, the die coating method, and the blade coating method can be used.

(11) Heat Treatment

In the method of producing the laminated film, to complete crystal orientation of a substrate film and also to complete heat setting of a resin composition and removal of a solvent to complete formation of a resin layer, the heat treatment can be carried out in a temperature range of 160 to 240° C. but needs to be carried out at not higher than the boiling point of the sugar alcohol (B1) and sugar alcohol derivative (B2). When the heat treatment is carried out at a temperature of not lower than 160° C. and not higher than the boiling point of the sugar alcohol (B1) and sugar alcohol derivative (B2), crystal orientation of a substrate film can be completed, and besides, during the process of removing a solvent or with the solvent having been removed, the acrylic-modified polyester (A) and the sugar alcohol (B1) and sugar alcohol derivative (B2) can be present as the solid content of the resin layer in an uniformly mixed state. Further, since the sugar alcohol (B1) and sugar alcohol derivative (B2) will not boil or evaporate, a resin layer free from cracks and roughening of the surface caused by the boiling and evaporation of the sugar alcohol (B1) and sugar alcohol derivative (B2) can be formed, and therefore the effect of oligomer inhibition can be expressed.

(12) Method of Producing Laminated Film

The method of producing the laminated film will now be described referring to the case where a polyethylene terephthalate (hereinafter referred to as PET for short) film is used as a thermoplastic resin film, but is not limited thereto. First, PET pellets are sufficiently vacuum-dried, and then the pellets are fed to an extruder and melt-extruded at about 280° C. into a sheet, which is cooled to solidify to produce an undrawn (nonoriented) PET film (A film). The film is drawn 2.5- to 5.0-fold in the longitudinal direction with rollers heated to 80 to 120° C. to obtain a uniaxially oriented PET film (B film). The resin composition prepared to have a predetermined concentration is applied onto one surface of the B film. In this step, before application, a surface treatment such as a corona discharge treatment may be carried out on the surface of the PET film to be coated. Carrying out a surface treatment such as a corona discharge treatment improves the wettability of the resin composition on the PET film and prevents the resin composition from being repelled, whereby a uniform coating thickness can be achieved.

After the application, the PET film is guided to a heat treatment zone (preheating zone) at 80 to 130° C. with the ends held by clips, and the solvent of the resin composition is dried. After the drying, the PET film is drawn 1.1- to 5.0-fold in the width direction. The PET film is successively guided to a heat treatment zone (heat fixation zone) at 160 to 240° C. and subjected to a heat treatment for 1 to 30 seconds to complete crystal orientation.

During this heat treatment process (heat fixation process), a relaxation treatment of 3 to 15% may be carried out in the width direction or the longitudinal direction as required. The laminated film thus obtained is a laminated film that is transparent and has an excellent inhibition of oligomer.

EXAMPLES

Methods of Measuring Properties and Methods of Evaluating Effects

The method of measuring the properties and methods of evaluating the effects are as described below.

(1) Calculation of Glass-Transition Temperature

The Tg of the acrylic resin component was calculated by substituting the Tg of single polymers (mass average molecular weight: not less than 2000) of each of the alkyl methacrylate, alkyl acrylate, and epoxy-containing acrylic monomer into the copolymer Tg approximation (1) below.

$$1/Tg = W_1/Tg_1 + W_2/Tg_2 \ldots + W_n/Tg_n \quad (1)$$

wherein

Tg: Tg of copolymer (K)

$Tg_1, Tg_2, Tg_n$: Tg of single polymers of each acrylic component (K)

$W_1, W_2, W_n$: mass fraction of each component ($W_1 + W_2 + \ldots + W_n = 1$).

(2) Total Light Transmittance/Haze Evaluation

Total light transmittance and haze were measured using a turbidimeter "NDH5000" manufactured by NIPPON DENSHOKU INDUSTRIES CO., LTD. after a laminated film sample was left to stand for 40 hours in normalcy (23° C., relative humidity: 50%). Measurement of total light transmittance and measurement of haze were performed in accordance with JIS "Test method of total light transmittance of transparent plastic material" (K7361-1, 1997) and JIS "Method for obtaining haze of transparent materials" (K7136, 2000), respectively. Three samples of a square of side 50 mm were prepared. Measurements were made once for each, three times in total, and the mean value was taken as the haze value of the sample.

(3) Heat-Treatment Evaluation

The laminated film sample used in the measurement of the above section (2) was fixed at four sides of a metal frame, and the sample fixed to the metal frame was placed upright against the floor in a hot-air dryer "HIGH-TEMP-OVEN PHH-200" manufactured by ESPEC CORPORATION. set at 140° C. (air flow gauge "7"), heated for one hour, and then left to stand for one hour under air cooling. For the sample from a thermoplastic resin film on only one surface of which a resin layer is formed, the thermoplastic resin film's surface opposite to the resin layer was wiped with an unwoven cloth (HAIZEGAUZE NT-4 available from OZU CORPORATION.) soaked with acetone, further flushed with acetone, and left to stand in normalcy for 40 hours for drying. Then the oligomers precipitated from the thermoplastic resin film's surface opposite to the resin layer were removed. Thereafter, the sample was measured for the haze value after heat treatment according to the method of measuring transmittance/haze described in the above section (2), and the difference (Δ) between the haze values at one surface of the resin layer before and after heat treatment was evaluated as Δ haze value (=(haze value after heat treatment)−(haze value before heat treatment)). For the sample from a thermoplastic resin film on both surfaces of which resin layers are formed, after heating in a hot-air dryer, the sample was left to stand in normalcy for 40 hours, and then the haze value after heat treatment was measured according to the method of measuring transmittance/haze described in the above section (2); the value obtained by halving (50%) the difference between the haze values before and after heat treatment was taken as the difference (Δ) of the haze value at one surface of the resin layer, which was evaluated as Δ haze value (=((haze value after heat treatment)−(haze value before heat treatment))/2).

<Δ Haze Value>

A: Less than 0.3%

B: Not less than 0.3% and less than 0.5%

C: 0.5% or more

In heat-treatment evaluation, "A" is good. When the Δ haze is less than 0.3%, the change in haze value before and after heat treatment is visually imperceptible. When the Δ haze is not less than 0.3% and less than 0.5%, while varying between individuals, the change in haze value before and after heat treatment can be visually perceptible. When the Δ haze is 0.5% or more, the change in haze value before and after heat treatment is visually apparent.

(4) Measurement of Resin Layer Thickness d

Ten samples were randomly taken out of a laminated film by dyeing-freezing superthin section method using $RuO_4$ staining and observed under a TEM (transmission electron microscope: H-7100FA manufactured by Hitachi Ltd.) at a magnification of 10000 to 1000000×, at which magnification the cross section structure can be visually observed, and photographs were taken. Each resin layer thickness was measured from the ten cross-section photographs, and the mean value was taken as the resin layer thickness d.

(5) Measurement of Particle-Size Distribution of Inorganic Particles

Samples were randomly taken out of a laminated film by dyeing-freezing superthin section method using $RuO_4$ staining and observed under a TEM (transmission electron microscope: H-7100FA manufactured by Hitachi Ltd.) at a magnification of 10000 to 1000000×, at which magnification the form of inorganic particles can be visually observed from a cross section, and 100 or more photographs of inorganic particles were taken. From 100 inorganic-particle cross-section photographs randomly selected from them, each particle size was measured in nanometers. In the case where the particle was a perfect circle, an arbitrary diameter was measured, and in the case where the particle was oval, the shortest diameter was measured. The particle sizes measured were converted in such a manner that the last digit was converted to 0 in the case where the last digit was 0, 1, or 2; the last digit was converted to 5 in the case where the last digit was 3, 4, 5, 6, or 7; and the last digit was converted to 0 and the second last digit was increased by 1 in the case where the last digit was 8 or 9. For example, in the case where the particle size measured was 98 to 102 nm, it was converted to 100 nm, and in the case where the particle size measured was 103 to 107 nm, it was converted to 105 nm. The particle sizes thus converted was plotted in a graph of frequency distribution in which the abscissa represents particle size (nm) and the ordinate represents frequency. In the case where a plurality of particle sizes having the same frequency was present, peaks of the distribution were numbered in order of decreasing particle size as mentioned above.

(6) Pressure Treatment Evaluation

In a pressure treatment test, samples were pressurized at a pressure of 10 kgf/cm² for one hour using a mechanical bench press (plastic film production equipment, G-12 type: manufactured by Technosupply Co. Ltd.) in normalcy (23° C., relative humidity: 65%), then subjected to a heat treatment by the same method as in (3) Heat-treatment evaluation, and evaluated as Δ haze value. As a sample, those which were obtained by laminating five laminated films sized to 15 cm×20 cm such that the surface of the laminated film on which surface a resin layer was not laminated and the resin layer surface of another laminated film were in contact was used. In the case of a laminated film on both surfaces of which resin layers were laminated, resin layer surfaces were laminated on each other. The evaluation criteria are the same as in (3).

<Δ Haze Value>

A: Less than 0.3%
B: Not less than 0.3% and less than 0.5%
C: 0.5% or more

Our films will be described more specifically by way of Examples. However, this disclosure is not limited to the following Examples. In both of the following Examples and Comparative Examples, the value of the number-average particle size of inorganic particles added into a resin composition was the peak position of the particle-size distribution of inorganic particles.

Example 1

A resin composition was prepared as described below.
Acrylic-Modified Polyester (A):
A polyester resin component was prepared by the preparation method described above using terephthalic acid, isophthalic acid, 5-sodium sulfoisophthalic acid, ethylene glycol, and diethylene glycol.

For the polyester resin component, terephthalic acid, isophthalic acid, ethylene glycol, and diethylene glycol were charged together with a polymerization catalyst into a reactor purged with nitrogen, and a polymerization reaction was carried out under normal pressure at 190 to 220° C. for 12 hours while removing water to obtain a polyester glycol. The polyester glycol obtained, 5-sodium sulfoisophthalic acid, and xylene as a solvent were charged into a reactor and allowed to polymerize for 3 hours while distilling off the xylene to obtain the polyester resin component. The polyester resin component was dissolved in aqueous ammonia and butyl cellulose-containing water.

Next, for an acrylic resin component having a Tg=77° C., an acrylic resin component having a mass ratio of isopropyl methacrylate (single polymer Tg: 81° C.)/glycidyl methacrylate (single polymer Tg: 41° C.)=90/10 was added together with a polymerization initiator into a water dispersion containing the above-described polyester resin component such that the mass ratio of the acrylic resin component/the polyester resin component=50/50, and a polymerization reaction was carried out in a reactor purged with nitrogen at 70 to 80° C. for 3 hours to obtain an acrylic-modified polyester.

Sugar Alcohol (B1):
D-glucitol (boiling point: 296° C., available from NACALAI TESQUE, INC.) was dissolved in pure water for preparation.

Aqueous Solvent (F): Pure Water
The acrylic-modified polyester (A) and the sugar alcohol (B1) were mixed and adjusted to have a mass ratio of (A/B1)= 97/3, i.e., (A/(B1+B2))=97/3. To impart smoothness to the laminated film surface after resin layer formation, silica particles having a number-average particle size of 170 nm (SNOWTEX (registered trademark) MP-2040 available from NISSAN CHEMICAL INDUSTRIES, LTD.) were added as the inorganic particles (D) in an amount of 2 parts by mass based on 100 parts by mass of the total of the acrylic-modified polyester (A) and the sugar alcohol (B1). In addition, to improve the application properties of the resin composition onto a thermoplastic resin film, the fluorochemical surfactant (E) (PLAS COAT (registered trademark) RY-2 available from GOO CHEMICAL CO., LTD.) was added such that the content based on the total resin composition was 0.02% by mass.

Next, PET pellets (limiting viscosity: 0.63 dl/g) substantially free of particles were sufficiently vacuum-dried and then fed to an extruder for melting at 285° C. Then, the melted polymer was extruded through a T-die into a sheet and wound around a mirror-finished casting drum at a surface temperature of 25° C. using an electro-pinning casting method to solidify by cooling. This undrawn film was drawn 3.4-fold in the longitudinal direction by heating to 90° C. to obtain a uniaxially drawn film (B film).

Next, a resin composition was applied to a corona discharge treatment surface of the uniaxially drawn film using a bar coater at a coating thickness of about 12 μm. The uniaxially drawn film coated with the resin composition was guided to a preheating zone with both ends in the width direction held by clips. After adjusting the ambient temperature to 75° C., the ambient temperature was subsequently adjusted to 110° C. using a radiation heater, and then the ambient temperature was adjusted to 90° C. to dry the composition for coating to thereby form a composition layer. Subsequently, the uniaxially drawn film was continuously drawn 3.5-fold in the width direction in a heating zone (drawing zone) at 120° C., and then subjected to a heat treatment in a heat treatment zone (heat fixation zone) at 230° C. for 20 seconds to obtain a laminated film with its crystal orientation being completed. In the laminated film obtained, the thickness of the PET film was 100 μm, and the thickness of the resin layer was about 0.15 μm. The properties of the laminated film obtained are shown in the Tables. The transparency such as haze and total light transmittance was excellent, and the Δ haze after 1-hour heat treatment at 140° C. and pressure treatment was less than 0.3%; thus the results of the heat-treatment evaluation were good.

Examples 2 to 6

A laminated film was obtained in the same manner as in Example 1 except that the mass ratio of the acrylic-modified polyester (A) to the sugar alcohol (B1) was changed to the values described in the Tables. The properties of the laminated film obtained are shown in the Tables. By increasing the mass ratio of the sugar alcohol (B1) in the order from Examples 2 to 6, homogeneous film-formation of the acrylic-modified polyester (A) was improved; initial haze was reduced compared to Example 1; and the Δ haze after 1-hour heat treatment at 140° C. and pressure treatment was less than 0.3%; thus the results of the heat-treatment evaluation were good.

Example 7

A laminated film was obtained in the same manner as in Example 1 except that the acrylic-modified polyester (A) and the sugar alcohol (B1) used in Example 1 and besides the oxazoline-based compound (C) described below were adjusted to have a mass ratio of (A/B1/C)=95/5/10, i.e., (A/(B1+B2)/C)=95/5/10.
Oxazoline-Based Compound (C):
Oxazoline-containing polymer aqueous dispersion (EPOCROS (registered trademark) WS-500 available from NIPPON SHOKUBAI CO., LTD.).

The properties of the laminated film obtained are shown in the Tables. In comparison with Example 2 using the same mass ratio of (A/(B1+B2)), the inclusion of the oxazoline-based compound (C) further reduced the Δ haze after 1-hour heat treatment at 140° C. while maintaining the transparency such as haze and total light transmittance; thus the results of the heat-treatment evaluation were good. On the other hand, the pressure treatment evaluation showed such somewhat poor results compared to Example 2 that degradation of the resin layer due to friction between resin layers and local pressure slightly occurred because the number-average particle size of an inorganic particle group was less than particle size 1.05 d.

Examples 8, 9

A laminated film was obtained in the same manner as in Example 7 except that the mass ratio of the acrylic-modified polyester (A) to the sugar alcohol (B1) to the compound (C) was changed to the values described in the Tables. The properties of the laminated film obtained are shown in the Tables. Although the mass ratio of the oxazoline-based compound (C) was increased in the order from Examples 8 to 9, similarly to the results of Example 7, the Δ haze after 1-hour heat treatment at 140° C. was more reduced than in Example 2 while the transparency such as haze and total light transmittance were maintained; thus the results of the heat-treatment evaluation were good. On the other hand, the pressure treatment evaluation showed such somewhat poor results similar to Example 7 that degradation of the resin layer due to friction between resin layers and local pressure slightly occurred because the number-average particle size of an inorganic particle group was less than particle size 1.05 d.

Example 10

A laminated film was obtained in the same manner as in Example 1 except that the acrylic resin component in the acrylic-modified polyester (A) was adjusted to have a mass ratio of methyl methacrylate (single polymer Tg: 105° C.)/glycidyl methacrylate (single polymer Tg: 41° C.)=90/10. The Tg of the acrylic resin component in the acrylic-modified polyester (A) was 97° C. The properties of the laminated film obtained are shown in the Tables. In comparison with Example 1, since the Tg of the acrylic resin component of the acrylic-modified polyester was high, the Δ haze after 1-hour heat treatment at 140° C. and pressure treatment was more reduced although the initial haze value was slightly increased; thus the results of the heat-treatment evaluation were good.

Examples 11 to 15

A laminated film was obtained in the same manner as in Example 10 except that the mass ratio of the acrylic-modified polyester (A) to the sugar alcohol (B1) was changed to the values described in the Tables. The properties of the laminated film obtained are shown in the Tables. In comparison with Examples 2 to 6 using the same mass ratio of (A/(B1+B2)) as in Examples 11 to 15, respectively, since the Tg of the acrylic resin component of the acrylic-modified polyester was high, the effect of oligomer inhibition was improved, and each Δ haze after 1-hour heat treatment at 140° C. and pressure treatment was more reduced while maintaining the transparency such as haze and total light transmittance; thus the results of the heat-treatment evaluation were good.

Example 16

A laminated film was obtained in the same manner as in Example 10 except that the acrylic-modified polyester (A) and the sugar alcohol (B1) used in Example 10 and besides the compound (C) used in Example 7 was adjusted to have a mass ratio of (A/B1/C)=90/10/10, i.e., (A/(B1+B2)/C)=90/10/10. The properties of the laminated film obtained are shown in the Tables. In comparison with Example 13 using the same mass ratio of (A/(B1+B2)), although the transparency such as haze and total light transmittance and the Δ haze after 1-hour heat treatment at 140° C. were somewhat poor because of the inclusion of the oxazoline-based compound (C), the haze was not more than 2%, and the Δ haze after 1-hour heat treatment at 140° C. and pressure treatment was less than 0.3%; thus the results of the heat-treatment evaluation were good.

Examples 17, 18

A laminated film was obtained in the same manner as in Example 16 except that the mass ratio of the acrylic-modified polyester (A) to the sugar alcohol (B1) to the compound (C) was changed to the values described in the Tables. The properties of the laminated film obtained are shown in the Tables. Although the mass ratio of the oxazoline-based compound (C) was increased in the order from Examples 17 to 18, in comparison with Example 13, although the transparency such as haze and total light transmittance and the Δ haze after 1-hour heat treatment at 140° C. were somewhat poor similarly to the results of Example 16, the haze was not more than 2%, and the Δ haze after 1-hour heat treatment at 140° C. and pressure treatment was less than 0.3%; thus the results of the heat-treatment evaluation were good.

However, in comparison with Examples 8 and 9, the Δ haze was reduced because the Tg of the acrylic resin component in the acrylic-modified polyester (A) was high.

Example 19

A laminated film was obtained in the same manner as in Example 10 except that the acrylic-modified polyester (A) and the sugar alcohol (B1) used in Example 10 and besides the carbodiimide-based compound (C) described below were adjusted to have a mass ratio of (A/B1/C)=90/10/30, i.e., (A/(B1+B2)/C)=90/10/30.
Carbodiimide-Based Compound (C):
Carbodiimide aqueous compound (Nisshinbo Chemical Inc., CARBODILITE (registered trademark) V-04).

The properties of the laminated film obtained are shown in the Tables. The results were the same as in Example 17 using the oxazoline-based compound (C), and in comparison with Example 13, although the transparency such as haze and total light transmittance and the Δ haze after 1-hour heat treatment at 140° C. were somewhat poor, the haze was not more than 2%, and the Δ haze after 1-hour heat treatment at 140° C. and pressure treatment was less than 0.3%; thus the results of the heat-treatment evaluation were good. However, in comparison with Example 8, the Δ haze was reduced because the Tg of the acrylic resin component in the acrylic-modified polyester (A) was high.

Example 20

A laminated film was obtained in the same manner as in Example 10 except that the acrylic-modified polyester (A) was prepared to have a mass ratio of the acrylic resin component/the polyester resin component=30/70 and that the mass ratio of the acrylic-modified polyester (A) to the sugar alcohol (B1) was changed to the values described in the Tables. The properties of the laminated film obtained are shown in the Tables. In comparison with Example 13 using the same mass ratio of (A/(B1+B2)), although the oligomer-inhibiting effect was somewhat poor because the acrylic resin component in the acrylic-modified polyester (A) was decreased, the Δ haze after 1-hour heat treatment at 140° C. was less than 0.3%; thus the results of the heat-treatment evaluation were good.

Example 21

A laminated film was obtained in the same manner as in Example 10 except that the acrylic-modified polyester (A) was prepared to have a mass ratio of the acrylic resin component/the polyester resin component=90/10 and that the mass ratio of the acrylic-modified polyester (A) to the sugar alcohol (B1) was changed to the values described in the Tables. The properties of the laminated film obtained are shown in the Tables. In comparison with Example 13 using the same mass ratio of (A/(B1+B2)), since the acrylic resin component in the acrylic-modified polyester (A) was increased, the transparency such as haze and total light transmittance were slightly improved, and the oligomer-inhibiting effect was maintained; thus the results of the heat-treatment evaluation were good.

Example 22

A laminated film was obtained in the same manner as in Example 10 except that the acrylic resin component in the acrylic-modified polyester (A) was adjusted to have a mass ratio of methyl methacrylate (single polymer Tg: 105° C.)/glycidyl methacrylate (single polymer Tg: 41° C.)=97/3 and that the mass ratio of the acrylic-modified polyester (A) to the sugar alcohol (B1) was changed to the values described in the Tables. The Tg of the acrylic resin component in the acrylic-modified polyester (A) was 103° C. The properties of the laminated film obtained are shown in the Tables. In comparison with Example 13 using the same mass ratio of (A/(B1+B2)), although the homogeneous film-formation of the acrylic-modified polyester (A) was slightly deteriorated and the initial haze was slightly increased because the Tg of the acrylic resin component in the acrylic-modified polyester (A) was high, the Δ haze after 1-hour heat treatment at 140° C. and pressure treatment were more reduced; thus the results of the heat-treatment evaluation were good.

Example 23

A laminated film was obtained in the same manner as in Example 10 except that the acrylic resin component in the acrylic-modified polyester (A) was adjusted to have a mass ratio of methyl methacrylate (single polymer Tg: 105° C.)/glycidyl methacrylate (single polymer Tg: 41° C.)=50/50 and that the mass ratio of the acrylic-modified polyester (A) to the sugar alcohol (B1) was changed to the values described in the Tables. The Tg of the acrylic resin component in the acrylic-modified polyester (A) was 70° C. The properties of the laminated film obtained are shown in the Tables. In comparison with Example 4 using the same mass ratio of (A/(B1+B2)), although the Δ haze after 1-hour heat treatment at 140° C. and pressure treatment was slightly increased because the Tg of the acrylic resin component in the acrylic-modified polyester (A) was low, the Δ haze was less than 0.3%; thus the results of the heat-treatment evaluation were good.

Example 24

A laminated film was obtained in the same manner as in Example 10 except that the acrylic-modified polyester (A) was prepared to have a mass ratio of the acrylic resin component/the polyester resin component=20/80 and that the mass ratio of the acrylic-modified polyester (A) to the sugar alcohol (B1) was changed to the values described in the Tables. The properties of the laminated film obtained are shown in the Tables. In comparison with Example 20 using the same mass ratio of (A/(B1+B2)), although the oligomer-inhibiting effect was somewhat poor because the acrylic resin component in the acrylic-modified polyester (A) was decreased, the Δ haze after 1-hour heat treatment at 140° C. was less than 0.3%; thus the results of the heat-treatment evaluation were good.

Example 25

A laminated film was obtained in the same manner as in Example 10 except that the acrylic resin component in the acrylic-modified polyester (A) was adjusted to have a mass ratio of methyl methacrylate (single polymer Tg: 105° C.)/glycidyl methacrylate (single polymer Tg: 41° C.)=45/55 and that the mass ratio of the acrylic-modified polyester (A) to the sugar alcohol (B1) was changed to the values described in the Tables. The Tg of the acrylic resin component in the acrylic-modified polyester (A) was 67° C. The properties of the laminated film obtained are shown in the Tables. In comparison with Example 23 using the same mass ratio of (A/(B1+B2)), although the Δ haze after 1-hour heat treatment at 140° C. was slightly increased because the Tg of the acrylic resin component in the acrylic-modified polyester (A) was low, the Δ haze was less than 0.3%; thus the results of the heat-treatment evaluation were good.

Example 26

A laminated film was obtained in the same manner as in Example 13 except that the number average particle size of silica particles was changed to 80 nm (Cataloid (registered trademark) SI-80P available from Catalysts & Chemicals Ind. Co., Ltd.) and that the resin layer thickness d was 75 nm. The properties of the laminated film obtained are shown in the Tables. In comparison with Example 13, the value of the Δ haze after 1-hour heat treatment at 140° C. was somewhat poor because the small number-average particle size of the silica particles increased the particle number in the same amount and the gap between the silica particles and a binder resin of the resin layer was increased, but this was practically acceptable. Further, in comparison with Example 13, the value of the Δ haze after pressure treatment evaluation was somewhat poor because the ratio of (number average particle size of inorganic particle size (peak position of particle-size distribution)/resin layer thickness d) was as small as 1.07 and the space between laminated films was narrow, but this was practically acceptable.

Example 27

A laminated film was obtained in the same manner as in Example 13 except that the number average particle size of silica particles was changed to 150 nm (SPHERICA (registered trademark) slurry 140 available from JGC C&C.) and that the resin layer thickness d was 75 nm. The properties of the laminated film obtained are shown in the Tables. In comparison with Example 13, although the thickness of the resin layer was reduced, the resin layers had the same composition ratio, and the silica particles had substantially the same number-average particle size, so that both the Δ haze after 1-hour heat treatment at 140° C. and pressure treatment and the Δ haze after heat treatment were equivalent; thus the results were good.

Example 28

A laminated film was obtained in the same manner as in Example 13 except that the number average particle size of silica particles was changed to 300 nm (SEAHOSTAR (registered trademark) KE-W30 available from NIPPON SHOKUBAI CO., LTD.) and that the resin layer thickness d was 75 nm. The properties of the laminated film obtained are shown in the Tables. In comparison with Example 13, although the thickness of the resin layer was reduced, the resin layers had the same composition ratio, and the number-average particle size of the silica particles was increased only to the extent that heat-treatment evaluation was not affected, so that the Δ haze after 1-hour heat treatment at 140° C. was equivalent; thus the results were good. In comparison with Example 13, since the ratio of (number average particle size of inorganic particle size (peak position of particle-size distribution)/resin layer thickness d) was as large as 4.00 and there was a sufficient gap between laminated films, the Δ haze after pressure treatment evaluation was equivalent; thus the results were good.

Example 29

A laminated film was obtained in the same manner as in Example 13 except that the number average particle size of silica particles was changed to 335 nm (SNOWTEX (registered trademark) MP-3040 available from NISSAN CHEMICAL INDUSTRIES, LTD.) and that the resin layer thickness d was 75 nm. The properties of the laminated film obtained are shown in the Tables. In comparison with Example 13, the value of the Δ haze after 1-hour heat treatment at 140° C. was somewhat poor because the increased number-average particle size of the silica particles increased the contact area between the silica particles and the binder resin of the resin layer in the same amount and the gap between the silica particles and the binder resin of the resin layer was increased, but this was practically acceptable. Also, in the pressure treatment evaluation, although the value of the Δ haze after pressure treatment evaluation was also somewhat poor for the same reason because heating was performed after pressurization, the results were good.

Examples 30 to 33

A laminated film was obtained in the same manner as in Example 27 except that the amount of silica particles (D) was changed to 0.2, 1.0, 3.0, and 4.0 parts by mass based on 100 parts by mass of the total of the acrylic-modified polyester resin (A) and the sugar alcohol (B1). In comparison with Example 27, in Example 30 in which the amount of (D) was 0.2 parts by mass, since the smoothness between laminated films was poor because of the small amount of silica particles, the resin layer was slightly deteriorated by the friction between laminated films upon handling, for example, in heat treatment, resulting in somewhat poor value of the Δ haze after heat treatment, but the results were practically acceptable. Further, since the gap between laminated films was somewhat hard to maintain compared to Example 27 because of the small amount of silica particles, the value of the Δ haze after pressure treatment was somewhat poor, but the results were practically acceptable.

In Examples 31 and 32, since the amount of silica particles was substantially the same as in Example 27, the Δ haze after heat treatment and after pressure treatment was almost the same; thus the results were good.

In Example 33, in comparison with Example 27, since the gap between silica particles and a binder resin of the resin layer was increased because of an increased amount of silica particles, the value of the Δ haze after 1-hour heat treatment at 140° C. was somewhat poor, but the results were practically acceptable. Also in the pressure treatment evaluation, although the value of the Δ haze after pressure treatment evaluation was also somewhat poor for the same reason because heating was performed after pressurization, the results were practically acceptable.

Examples 34 to 36

A laminated film was obtained in the same manner as in Example 27 except that the silica particles were changed to two types of particles having a number average particle size of 150 nm and 300 nm and added in the amount described in the Tables. The properties of the laminated film obtained are shown in the Tables. Further addition of 300-nm particles in an appropriate amount to Example 27 provided the laminated film with sufficient smoothness, so that the Δ haze after heat treatment was equivalent or more; thus the results were good. Further, the ratio of number-average particle size of inorganic particles (peak position of particle-size distribution)/resin layer thickness d) was 2.00/4.00, while it was 2.00 in Example 27, and there was sufficient space between the laminated films, so that the Δ haze after pressure treatment evaluation was equivalent or more; thus the results were good.

Examples 37 to 40

A laminated film was obtained in the same manner as in Example 27 except that the amount of the fluorochemical surfactant (E) was changed to 0.01, 0.05, 0.1, and 0.3% by mass based on the total resin composition. The properties of the laminated film obtained are shown in the Tables. As in Example 27, since the amount of the fluorochemical surfactant was preferable, the Δ haze after 1-hour heat treatment at 140° C. and the Δ haze after pressure treatment evaluation were both equivalent; thus the results were good.

Examples 41, 42

A laminated film was obtained in the same manner as in Example 35 except that the amount of the fluorochemical surfactant (E) was changed to 0.05 and 0.1% by mass based on the total resin composition. The properties of the laminated film obtained are shown in the Tables. As in Example 35, since the amount of the fluorochemical surfactant was preferable, the Δ haze after 1-hour heat treatment at 140° C. and the Δ haze after pressure treatment evaluation were both equivalent; thus the results were good.

Example 43

A laminated film was obtained in the same manner as in Example 40 except that the oxazoline-based compound (C) used in Example 7 was added in an amount of 10 parts by mass based on 100 parts by mass of the total of the acrylic-modified polyester (A) and the sugar alcohol (B1). The properties of the laminated film obtained are shown in the Tables. In comparison with Example 40, since the abundance ratio of the acrylic-modified polyester (A) was decreased relative to the same resin layer thickness, both of the values of the Δ haze after 1-hour heat treatment at 140° C. and the Δ haze after pressure treatment evaluation were poor, but the results were practically acceptable.

Example 44

A laminated film was obtained in the same manner as in Example 42 except that the oxazoline-based compound (C) used in Example 7 was added in an amount of 10 parts by mass based on 100 parts by mass of the total of the acrylic-modified polyester (A) and the sugar alcohol (B1). The properties of the laminated film obtained are shown in the Tables. In comparison with Example 42, since the abundance ratio of the acrylic-modified polyester (A) was decreased relative to the same resin layer thickness, both of the values of the Δ haze after 1-hour heat treatment at 140° C. and the Δ haze after pressure treatment evaluation were poor, but the results were practically acceptable.

Example 45

A laminated film was obtained in the same manner as in Example 40 except that the oxazoline-based compound (C) used in Example 7 was added in an amount of 30 parts by mass based on 100 parts by mass of the total of the acrylic-modified polyester (A) and the sugar alcohol (B1). The properties of the laminated film obtained are shown in the Tables. In comparison with Example 40, since the abundance ratio of the acrylic-modified polyester (A) was decreased relative to the same resin layer thickness, both of the values of the Δ haze after 1-hour heat treatment at 140° C. and the Δ haze after pressure treatment evaluation were poor, but the results were practically acceptable.

Example 46

A laminated film was obtained in the same manner as in Example 42 except that the oxazoline-based compound (C) used in Example 7 was added in an amount of 30 parts by mass based on 100 parts by mass of the total of the acrylic-modified polyester (A) and the sugar alcohol (B1). The properties of the laminated film obtained are shown in the Tables. In comparison with Example 42, since the abundance ratio of (A) was decreased relative to the same resin layer thickness, both of the values of the Δ haze after 1-hour heat treatment at 140° C. and the Δ haze after pressure treatment evaluation were poor, but the results were practically acceptable.

Example 47

A laminated film was obtained in the same manner as in Example 1 except that the acrylic resin component in the acrylic-modified polyester (A) was adjusted to have a mass ratio of methyl methacrylate (single polymer Tg: 105° C.)/ glycidyl methacrylate (single polymer Tg: 41° C.)=85/15. The Tg of the acrylic resin component in the acrylic-modified polyester (A) was 93° C. The properties of the laminated film obtained are shown in the Tables. In comparison with Example 1, since the Tg of the acrylic resin component of the acrylic-modified polyester was high, the Δ haze after 1-hour heat treatment at 140° C. and pressure treatment was more reduced although the initial haze value was slightly increased; thus the results of the heat-treatment evaluation were good.

Examples 48 to 52

A laminated film was obtained in the same manner as in Example 1 except that the mass ratio of the acrylic-modified polyester (A) to the sugar alcohol (B1) was changed to the values described in the Tables. The properties of the laminated film obtained are shown in the Tables. By increasing the mass ratio of (B1+B2) in the order from Examples 48 to 52, homogeneous film-formation of the acrylic-modified polyester (A) was improved; initial haze was reduced compared to Example 47; and the Δ haze after 1-hour heat treatment at 140° C. and pressure treatment was less than 0.3%; thus the results of the heat-treatment evaluation were good.

Example 53

A laminated film was obtained in the same manner as in Example 47 except that the acrylic-modified polyester (A) and the sugar alcohol (B1) used in Example 47 and besides the compound (C) used in Example 7 was adjusted to have a mass ratio of (A/B1/C)=90/10/10, i.e., (A/(B1+B2)/C)=90/10/10. The properties of the laminated film obtained are shown in the Tables. In comparison with Example 50 using the same mass ratio of (A/(B1+B2)), although the transparency such as haze and total light transmittance and the Δ haze after 1-hour heat treatment at 140° C. were somewhat poor because of the inclusion of the compound (C) comprising an oxazoline-based compound, the haze was not more than 2%, and the Δ haze after 1-hour heat treatment at 140° C. and pressure treatment was less than 0.3%; thus the results of the heat-treatment evaluation were good.

Examples 54, 55

A laminated film was obtained in the same manner as in Example 53 except that the mass ratio of the acrylic-modified polyester (A) to the sugar alcohol (B1) to the compound (C) was changed to the values described in the Tables. The properties of the laminated film obtained are shown in the Tables. Although the mass ratio of the compound (C) comprising an oxazoline-based compound was increased in the order from Examples 54 to 55, in comparison with Example 50, although the transparency such as haze and total light transmittance and the Δ haze after 1-hour heat treatment at 140° C. were somewhat poor similarly to the results of Example 53, the haze was not more than 2%, and the Δ haze after 1-hour heat treatment at 140° C. and pressure treatment was less than 0.3%; thus the results of the heat-treatment evaluation were good. However, in comparison with Examples 7 and 8, the Δ haze was reduced because the Tg of the acrylic resin component in the acrylic-modified polyester (A) was high.

Example 56

A laminated film was obtained in the same manner as in Example 10 except that the acrylic-modified polyester (A) and the sugar alcohol (B1) used in Example 10 and besides the epoxy-based compound (C) described below were adjusted to have a mass ratio of (A/B1/C)=90/10/30, i.e., (A/(B1+B2)/C)=90/10/30.
Epoxy-Based Compound (C):
Sorbitol polyglycidyl ether-based epoxy compound (DE-NACOL (registered trademark) EX-614B available from Nagase ChemteX Corporation)
The properties of the laminated film obtained are shown in the Tables. The results were the same as in Example 17 using the oxazoline-based compound (C), and in comparison with Example 13, although the transparency such as haze and total light transmittance and the Δ haze after 1-hour heat treatment at 140° C. were somewhat poor, the haze was not more than 2%, and the Δ haze after 1-hour heat treatment at 140° C. and pressure treatment was less than 0.3%; thus the results of the heat-treatment evaluation were good.

Example 57

A laminated film was obtained in the same manner as in Example 10 except that the acrylic-modified polyester (A) and the sugar alcohol (B1) used in Example 10 and besides the melamine-based compound (C) described below were adjusted to have a mass ratio of (A/B1/C)=90/10/30, i.e., (A/(B1+B2)/C)=90/10/30.
Melamine-Based Compound (C):
Melamine-formaldehyde-based compound (BECKA-MINE (registered trademark) APM available from DIC Corporation)
The properties of the laminated film obtained are shown in the Tables. The results were the same as in Example 17 using the oxazoline-based compound (C), and in comparison with Example 13, although the transparency such as haze and total light transmittance and the Δ haze after 1-hour heat treatment at 140° C. were somewhat poor, the haze was not more than 2%, and the Δ haze after 1-hour heat treatment at 140° C. and pressure treatment was less than 0.3%; thus the results of the heat-treatment evaluation were good.

Example 58

The acrylic-modified polyester (A) used in Example 10 and the sugar alcohol derivative (B2) below were adjusted to have a mass ratio of (A/B2)=90/10, i.e., (A/(B1+B2))=90/10, and a laminated film was obtained in the same manner as in Example 13.
Sugar Alcohol Derivative (B2):
3,4-O-isopropylidene-D-mannitol (available from TOKYO CHEMICAL INDUSTRY CO., LTD.)
The properties of the laminated film obtained are shown in the Tables. In comparison with Example 13 using the sugar alcohol (B1), although the transparency such as haze and total light transmittance and the Δ haze after 1-hour heat treatment at 140° C. were somewhat poor, the haze was not more than 2%, and the Δ haze after 1-hour heat treatment at 140° C. and pressure treatment was less than 0.3%; thus the results of the heat-treatment evaluation were good.

Example 59

The acrylic-modified polyester (A) used in Example 10 and the sugar alcohol derivative (B2) below were adjusted to have a mass ratio of (A/B2)=90/10, i.e., (A/(B1+B2))=90/10, and a laminated film was obtained in the same manner as in Example 13.
Sugar Alcohol Derivative (B2):
Pentaerythritol triacrylate (NK Ester A-TMM-3 available from Shin-Nakamura Chemical Co., Ltd.)
The properties of the laminated film obtained are shown in the Tables. In comparison with Example 13 using the sugar alcohol (B1), although the transparency such as haze and total light transmittance and the Δ haze after 1-hour heat treatment at 140° C. were somewhat poor, the haze was not more than 2%, and the Δ haze after 1-hour heat treatment at 140° C. and pressure treatment was less than 0.3%; thus the results of the heat-treatment evaluation were good.

Comparative Example 1

A laminated film was obtained in the same manner as in Example 1 except that the mass ratio of the acrylic-modified polyester (A) to the sugar alcohol (B1) was changed to the values described in the Tables. The properties of the laminated film obtained are shown in the Tables. The mass ratio of the acrylic-modified polyester (A) to the sugar alcohol (B1) was (A/B1) 72/28, i.e., (A/(B1+B2))=72/28; the ratio of (A) was less than 0.75 (that is, the ratio of the total of (B1+B2) was more than 0.25). Therefore, in comparison with, for example, Example 6 in which the acrylic component in the acrylic-modified polyester (A) had the same Tg and the mass ratio of (A/(B1+B2)) was most approximate, although the transparency such as initial haze and total light transmittance was equivalent, the effect of oligomer inhibition of the acrylic-modified polyester (A) was insufficient, resulting in that the Δ haze after 1-hour heat treatment at 140° C. was more than 0.3%; thus the results of the heat-treatment evaluation was poor.

Comparative Example 2

A laminated film was obtained in the same manner as in Example 1 except that the mass ratio of the acrylic-modified polyester (A) to the sugar alcohol (B1) was changed to the values described in the Tables. The properties of the laminated film obtained are shown in the Tables. The mass ratio of the acrylic-modified polyester (A) to the sugar alcohol (B1) was (A/B1)=-99/1, i.e., (A/(B1+B2))=99/1; the ratio of the total of (B1+B2) was less than 0.03 (the ratio of (A) was more than 0.97). Therefore, in comparison with, for example, Example 1 in which the acrylic component in the acrylic-modified polyester (A) had the same Tg and the mass ratio of (A/(B1+B2)) was most approximate, the imparting of homogeneous film-formation from the sugar alcohol (B1) to the acrylic-modified polyester (A) was insufficient, which caused cracks in the resin layer, resulting in that the initial haze was not less than 2.0%; thus the transparency was poor. In addition, oligomers precipitated from the cracks in the resin layer and, therefore the Δ haze after 1-hour heat treatment at 140° C. was more than 0.3%; thus the results of the heat-treatment evaluation was poor.

Comparative Example 3

A laminated film was obtained in the same manner as in Example 1 except that the mass ratio of the acrylic-modified polyester (A) to the sugar alcohol (B1) was changed to the values described in the Tables. The properties of the laminated film obtained are shown in the Tables. The mass ratio of the acrylic-modified polyester (A) to the sugar alcohol (B1) was (A/B1)=72/28, i.e., (A/(B1+B2))=72/28; the ratio of (A) was less than 0.75 (that is, the ratio of the total of (B1+B2) was more than 0.25). Therefore, in comparison with, for example, Example 15 in which the acrylic component in the acrylic-modified polyester (A) had the same Tg and the mass ratio of (A/(B1+B2)) was most approximate, although the transparency such as initial haze and total light transmittance was equivalent, the effect of oligomer inhibition of the acrylic-modified polyester (A) was insufficient, resulting in that the Δ haze after 1-hour heat treatment at 140° C. was more than 0.3%; thus the results of the heat-treatment evaluation was poor.

Comparative Example 4

A laminated film was obtained in the same manner as in Example 7 except that the mass ratio of the acrylic-modified polyester (A) to the sugar alcohol (B1) was changed to the values described in the Tables. The properties of the laminated film obtained are shown in the Tables. The mass ratio of the acrylic-modified polyester (A) to the sugar alcohol (B1) was (A/B1)=99/1, i.e., (A/(B1+B2))=99/1, the ratio of the total of (B1+B2) was less than 0.03 (the ratio of (A) was more than 0.97). Therefore, in comparison with Example 10 in which the acrylic component in the acrylic-modified polyester (A) had the same Tg and the mass ratio of (A/(B1+B2)) was most approximate, the imparting of homogeneous film-formation from the sugar alcohol (B1) to the acrylic-modified polyester (A) was insufficient, which caused cracks in the resin layer, resulting in that the initial haze was not less than 2.0%; thus the transparency was poor. In addition, oligomers precipitated from the cracks in the resin layer and, therefore the Δ haze after 1-hour heat treatment at 140° C. was more than 0.3%; thus the results of the heat-treatment evaluation was poor.

Comparative Example 5

A laminated film was obtained in the same manner as in Example 1 except using one prepared by dissolving ethylene glycol (boiling point: 197° C., available from Kanto Chemical Industry Co., Ltd.) in pure water in place of D-glucitol as a sugar alcohol (B1). Ethylene glycol is not a sugar alcohol (B1) or a sugar alcohol derivative (B2). The properties of the laminated film obtained are shown in the Tables. In a laminated film-forming process, a heat treatment was applied for 20 seconds at a heat treatment zone (heat fixation zone) at 230° C., which is higher than the boiling point of ethylene glycol, and therefore the ethylene glycol in the resin layer precipitated from inside the resin layer and evaporated, causing cracks in the resin layer. The crack generation resulted in that the initial haze was not less than 2.0%, and thus the transparency was poor. In addition, since oligomers precipitated from the cracks, the Δ haze after 1-hour heat treatment at 140° C. was more than 0.3%, and thus the results of the heat-treatment evaluation was poor.

Comparative Example 6

A laminated film was obtained in the same manner as in Example 1 except that the acrylic resin component in the acrylic-modified polyester (A) was adjusted to have a mass ratio of ethyl methacrylate (single polymer Tg: 65° C.)/glycidyl methacrylate (single polymer Tg: 41° C.)=90/10. The properties of the laminated film obtained are shown in the Tables. The Tg of the acrylic resin component in the acrylic-modified polyester (A) was 62° C. The Tg of the acrylic resin component in the acrylic-modified polyester (A) was not more than 67° C., and, in comparison with Example 4 using the same mass ratio of (A/(B1+B2)), the transparency such as initial haze and total light transmittance was equivalent. However, the effect of oligomer inhibition was insufficient, resulting in that the Δ haze after 1-hour heat treatment at 140° C. was more than 0.3%, and thus the results of the heat-treatment evaluation was poor.

Comparative Example 7

A laminated film was obtained in the same manner as in Example 10 except that the mass ratio of the acrylic-modified polyester (A) to the sugar alcohol (B1) was changed to the values described in the Tables. The properties of the laminated film obtained are shown in the Tables. The mass ratio of the acrylic-modified polyester (A) to the sugar alcohol (B1) was (A/B1)=100/0, i.e., (A/(B1+B2))=100/0, meaning that only (A) was contained, and the ratio of the total of (B1+B2) was less than 0.03 (the ratio of (A) was more than 0.97). Therefore, in comparison with Example 10 in which the acrylic component in the acrylic-modified polyester (A) had the same Tg and the mass ratio of (A/(B1+B2)) was most approximate, the imparting of homogeneous film-formation from the sugar alcohol (B1) to the acrylic-modified polyester (A) was severely deficient, which caused cracks in the resin layer, resulting in that the initial haze was not less than 2.0%; thus the transparency was poor. In addition, oligomers precipitated from the cracks in the resin layer and, therefore the Δ haze after 1-hour heat treatment at 140° C. was more than 0.3%; thus the results of the heat-treatment evaluation was poor.

Comparative Example 8

A laminated film was obtained in the same manner as in Example 10 except that the mass ratio of the acrylic-modified polyester (A) to the sugar alcohol (B1) was changed to the values described in the Tables. The properties of the laminated film obtained are shown in the Tables. The mass ratio of the acrylic-modified polyester (A) to the sugar alcohol (B1) was (A/B1)=100/0, i.e., (A/(B1+B2))=100/0, meaning that only (A) was contained; the ratio of the total of (B1+B2) was less than 0.03 (the ratio of (A) was more than 0.97). Therefore, in comparison with Example 1 in which the acrylic component in the acrylic-modified polyester (A) had the same Tg and the mass ratio of (A/(B1+B2)) was most approximate, the imparting of homogeneous film-formation from the sugar alcohol (B1) to the acrylic-modified polyester (A) was severely deficient, which caused cracks in the resin layer, resulting in that the initial haze was not less than 2.0%; thus the transparency was poor. In addition, oligomers precipitated from the cracks in the resin layer and, therefore the Δ haze after 1-hour heat treatment at 140° C. was more than 0.3%; thus the results of the heat-treatment evaluation was poor.

The composition and evaluation results of each Example and Comparative Example are summarized in Tables 1 to 15. For Comparative Example 5, (B1+B2) represents the mass of ethylene glycol.

TABLE 1

|  | The mass ratio of (A) to (B1 + B2) | | The amount of (C) based on 100 parts by mass of total of (A + B1 + B2) | The total content of (A + B1 + B2) based on total resin layer |
|---|---|---|---|---|
|  | (A) | (B1 + B2) | (parts by mass) | (% by mass) |
| Example 1 | 97 | 3 | 0 | 98 |
| Example 2 | 95 | 5 | 0 | 98 |
| Example 3 | 93 | 7 | 0 | 98 |
| Example 4 | 90 | 10 | 0 | 98 |
| Example 5 | 85 | 15 | 0 | 98 |
| Example 6 | 75 | 25 | 0 | 98 |
| Example 7 | 95 | 5 | 10 | 89 |
| Example 8 | 95 | 5 | 30 | 76 |
| Example 9 | 95 | 5 | 50 | 66 |
| Example 10 | 97 | 3 | 0 | 98 |
| Example 11 | 95 | 5 | 0 | 98 |
| Example 12 | 93 | 7 | 0 | 98 |
| Example 13 | 90 | 10 | 0 | 98 |
| Example 14 | 85 | 15 | 0 | 98 |
| Example 15 | 75 | 25 | 0 | 98 |
| Example 16 | 90 | 10 | 10 | 89 |
| Example 17 | 90 | 10 | 30 | 76 |
| Example 18 | 90 | 10 | 50 | 66 |
| Example 19 | 90 | 10 | 30 | 76 |
| Example 20 | 90 | 10 | 0 | 98 |
| Example 21 | 90 | 10 | 0 | 98 |
| Example 22 | 90 | 10 | 0 | 98 |
| Example 23 | 90 | 10 | 0 | 98 |
| Example 24 | 90 | 10 | 0 | 98 |
| Example 25 | 90 | 10 | 0 | 98 |

(A): Acrylic-modified polyester resin
(B1): Sugar alcohol
(B2): Sugar alcohol derivative
(C): Additive comprising oxazoline-based compound and/or carbodiimide-based compound

TABLE 2

|  | Resin layer thickness d (nm) | The amount of (D) based on 100 parts by mass of total of (A + B1 + B2) (parts by mass) | The number-average particle size (D) (nm) | (D) number-average particle size/Resin layer thickness d | The content of (E) based on total resin composition (parts by mass) |
|---|---|---|---|---|---|
| Example 1 | 150 | 2 | 170 | 1.13 | 0.02 |
| Example 2 | 150 | 2 | 170 | 1.13 | 0.02 |
| Example 3 | 150 | 2 | 170 | 1.13 | 0.02 |
| Example 4 | 150 | 2 | 170 | 1.13 | 0.02 |
| Example 5 | 150 | 2 | 170 | 1.13 | 0.02 |
| Example 6 | 150 | 2 | 170 | 1.13 | 0.02 |
| Example 7 | 165 | 2 | 170 | 1.03 | 0.02 |
| Example 8 | 195 | 2 | 170 | 0.87 | 0.02 |
| Example 9 | 225 | 2 | 170 | 0.76 | 0.02 |
| Example 10 | 150 | 2 | 170 | 1.13 | 0.02 |
| Example 11 | 150 | 2 | 170 | 1.13 | 0.02 |
| Example 12 | 150 | 2 | 170 | 1.13 | 0.02 |
| Example 13 | 150 | 2 | 170 | 1.13 | 0.02 |
| Example 14 | 150 | 2 | 170 | 1.13 | 0.02 |
| Example 15 | 150 | 2 | 170 | 1.13 | 0.02 |
| Example 16 | 150 | 2 | 170 | 1.13 | 0.02 |
| Example 17 | 150 | 2 | 170 | 1.13 | 0.02 |
| Example 18 | 150 | 2 | 170 | 1.13 | 0.02 |
| Example 19 | 150 | 2 | 170 | 1.13 | 0.02 |
| Example 20 | 150 | 2 | 170 | 1.13 | 0.02 |
| Example 21 | 150 | 2 | 170 | 1.13 | 0.02 |
| Example 22 | 150 | 2 | 170 | 1.13 | 0.02 |
| Example 23 | 150 | 2 | 170 | 1.13 | 0.02 |
| Example 24 | 150 | 2 | 170 | 1.13 | 0.02 |
| Example 25 | 150 | 2 | 170 | 1.13 | 0.02 |

(A): Acrylic-modified polyester resin
(B1): Sugar alcohol
(B2): Sugar alcohol derivative
(D): Inorganic particles
(E): Fluorochemical surfactant

TABLE 3

| | (A) Components | | |
|---|---|---|---|
| | Tg | Acrylic resin component/Polyester resin component | Alkyl acrylate•Alkyl methacrylate/Epoxy-containing acrylic monomer |
| Example 1 | 77 | 50/50 | 90/10 |
| Example 2 | 77 | 50/50 | 90/10 |
| Example 3 | 77 | 50/50 | 90/10 |
| Example 4 | 77 | 50/50 | 90/10 |
| Example 5 | 77 | 50/50 | 90/10 |
| Example 6 | 77 | 50/50 | 90/10 |
| Example 7 | 77 | 50/50 | 90/10 |
| Example 8 | 77 | 50/50 | 90/10 |
| Example 9 | 77 | 50/50 | 90/10 |
| Example 10 | 97 | 50/50 | 90/10 |
| Example 11 | 97 | 50/50 | 90/10 |
| Example 12 | 97 | 50/50 | 90/10 |
| Example 13 | 97 | 50/50 | 90/10 |
| Example 14 | 97 | 50/50 | 90/10 |
| Example 15 | 97 | 50/50 | 90/10 |
| Example 16 | 97 | 50/50 | 90/10 |
| Example 17 | 97 | 50/50 | 90/10 |
| Example 18 | 97 | 50/50 | 90/10 |
| Example 19 | 97 | 50/50 | 90/10 |
| Example 20 | 97 | 30/70 | 90/10 |
| Example 21 | 97 | 90/10 | 90/10 |
| Example 22 | 103 | 50/50 | 97/3 |
| Example 23 | 70 | 50/50 | 50/50 |
| Example 24 | 97 | 20/80 | 90/10 |
| Example 25 | 67 | 50/50 | 45/55 |

(A): Acrylic-modified polyester resin

TABLE 4

| | Evaluation results | | | | |
|---|---|---|---|---|---|
| | Transmittance (%) | Initial haze (%) | Haze after heat treatment (%) | Δ haze | Heat-treatment evaluation |
| Example 1 | 90.0 | 0.85 | 1.05 | 0.20 | A |
| Example 2 | 90.0 | 0.60 | 0.82 | 0.22 | A |
| Example 3 | 90.0 | 0.55 | 0.78 | 0.23 | A |
| Example 4 | 90.1 | 0.45 | 0.70 | 0.25 | A |
| Example 5 | 90.1 | 0.43 | 0.70 | 0.27 | A |
| Example 6 | 90.1 | 0.40 | 0.69 | 0.29 | A |
| Example 7 | 89.9 | 0.65 | 0.80 | 0.15 | A |
| Example 8 | 89.9 | 0.70 | 0.87 | 0.17 | A |
| Example 9 | 89.6 | 0.86 | 1.05 | 0.19 | A |
| Example 10 | 89.5 | 1.35 | 1.50 | 0.15 | A |
| Example 11 | 89.8 | 0.60 | 0.74 | 0.14 | A |
| Example 12 | 89.8 | 0.59 | 0.72 | 0.13 | A |
| Example 13 | 89.9 | 0.50 | 0.59 | 0.09 | A |
| Example 14 | 89.9 | 0.45 | 0.60 | 0.15 | A |
| Example 15 | 89.9 | 0.40 | 0.55 | 0.15 | A |
| Example 16 | 89.3 | 0.60 | 0.75 | 0.15 | A |
| Example 17 | 89.2 | 0.85 | 0.99 | 0.14 | A |
| Example 18 | 89.0 | 1.30 | 1.42 | 0.12 | A |
| Example 19 | 89.1 | 0.81 | 0.97 | 0.16 | A |
| Example 20 | 88.5 | 0.75 | 1.03 | 0.28 | A |
| Example 21 | 90.0 | 0.48 | 0.57 | 0.09 | A |
| Example 22 | 88.2 | 1.30 | 1.38 | 0.08 | A |
| Example 23 | 89.9 | 0.60 | 0.86 | 0.26 | A |
| Example 24 | 87.5 | 0.80 | 1.09 | 0.29 | A |
| Example 25 | 89.8 | 0.59 | 0.88 | 0.29 | A |

TABLE 5

| | Evaluation results | | | |
|---|---|---|---|---|
| | Initial haze (%) | Haze after pressure treatment (%) | Δ haze | Pressure treatment evaluation |
| Example 1 | 0.85 | 1.11 | 0.26 | A |
| Example 2 | 0.60 | 0.87 | 0.27 | A |
| Example 3 | 0.55 | 0.82 | 0.27 | A |
| Example 4 | 0.45 | 0.73 | 0.28 | A |
| Example 5 | 0.43 | 0.72 | 0.29 | A |
| Example 6 | 0.40 | 0.69 | 0.29 | A |
| Example 7 | 0.65 | 0.97 | 0.32 | B |
| Example 8 | 0.70 | 1.05 | 0.35 | B |
| Example 9 | 0.86 | 1.28 | 0.42 | B |
| Example 10 | 1.35 | 1.55 | 0.20 | A |
| Example 11 | 0.60 | 0.81 | 0.21 | A |
| Example 12 | 0.59 | 0.74 | 0.15 | A |
| Example 13 | 0.50 | 0.64 | 0.14 | A |
| Example 14 | 0.45 | 0.67 | 0.22 | A |
| Example 15 | 0.40 | 0.59 | 0.19 | A |
| Example 16 | 0.60 | 0.81 | 0.21 | A |
| Example 17 | 0.85 | 1.07 | 0.22 | A |
| Example 18 | 1.30 | 1.52 | 0.22 | A |
| Example 19 | 0.81 | 1.08 | 0.27 | A |
| Example 20 | 0.75 | 1.03 | 0.28 | A |
| Example 21 | 0.48 | 0.65 | 0.17 | A |
| Example 22 | 1.30 | 1.44 | 0.14 | A |
| Example 23 | 0.60 | 0.89 | 0.29 | A |
| Example 24 | 0.80 | 1.10 | 0.30 | B |
| Example 25 | 0.59 | 0.89 | 0.30 | B |

TABLE 6

| | The mass ratio of (A) to (B1 + B2) | | The amount of (C) based on 100 parts by mass of total of (A + B1 + B2) (parts by mass) | The total content of (A + B1 + B2) based on total resin layer (% by mass) |
|---|---|---|---|---|
| | (A) | (B1 + B2) | | |
| Example 26 | 90 | 10 | 0 | 98 |
| Example 27 | 90 | 10 | 0 | 98 |
| Example 28 | 90 | 10 | 0 | 98 |
| Example 29 | 90 | 10 | 0 | 98 |
| Example 30 | 90 | 10 | 0 | 99.8 |
| Example 31 | 90 | 10 | 0 | 99 |
| Example 32 | 90 | 10 | 0 | 97 |
| Example 33 | 90 | 10 | 0 | 96 |
| Example 34 | 90 | 10 | 0 | 97.5 |
| Example 35 | 90 | 10 | 0 | 97 |
| Example 36 | 90 | 10 | 0 | 96 |
| Example 37 | 90 | 10 | 0 | 98 |
| Example 38 | 90 | 10 | 0 | 98 |
| Example 39 | 90 | 10 | 0 | 98 |
| Example 40 | 90 | 10 | 0 | 98 |
| Example 41 | 90 | 10 | 0 | 97 |
| Example 42 | 90 | 10 | 0 | 97 |
| Example 43 | 90 | 10 | 10 | 89 |
| Example 44 | 90 | 10 | 10 | 88 |
| Example 45 | 90 | 10 | 30 | 76 |
| Example 46 | 90 | 10 | 30 | 75 |

(A): Acrylic-modified polyester resin
(B1): Sugar alcohol
(B2): Sugar alcohol derivative
(C): Additive comprising oxazoline-based compound and/or carbodiimide-based compound

TABLE 7

| | Resin layer thickness d (nm) | The amount of (D) based on 100 parts by mass of total of (A + B1 + B2) (parts by mass) | The number-average particle size (D) (nm) | The number-average particle size (D)/ Resin layer thickness d | The content of (E) based on total resin composition (parts by mass) |
|---|---|---|---|---|---|
| Example 26 | 75 | 2 | 80 | 1.07 | 0.02 |
| Example 27 | 75 | 2 | 150 | 2.00 | 0.02 |
| Example 28 | 75 | 2 | 300 | 4.00 | 0.02 |
| Example 29 | 75 | 2 | 335 | 4.47 | 0.02 |
| Example 30 | 75 | 0.2 | 150 | 2.00 | 0.02 |
| Example 31 | 75 | 1 | 150 | 2.00 | 0.02 |
| Example 32 | 75 | 3 | 150 | 2.00 | 0.02 |
| Example 33 | 75 | 4 | 150 | 2.00 | 0.02 |
| Example 34 | 75 | 2/0.5 | 150/300 | 2.00/4.00 | 0.02 |
| Example 35 | 75 | 2/1 | 150/300 | 2.00/4.00 | 0.02 |
| Example 36 | 75 | 2/2 | 150/300 | 2.00/4.00 | 0.02 |
| Example 37 | 75 | 2 | 150 | 2.00 | 0.01 |
| Example 38 | 75 | 2 | 150 | 2.00 | 0.05 |
| Example 39 | 75 | 2 | 150 | 2.00 | 0.1 |
| Example 40 | 75 | 2 | 150 | 2.00 | 0.3 |
| Example 41 | 75 | 2/1 | 150/300 | 2.00/4.00 | 0.05 |
| Example 42 | 75 | 2/1 | 150/300 | 2.00/4.00 | 0.1 |
| Example 43 | 75 | 2 | 150 | 2.00 | 0.1 |
| Example 44 | 75 | 2/1 | 150/300 | 2.00/4.00 | 0.1 |
| Example 45 | 75 | 2 | 150 | 2.00 | 0.1 |
| Example 46 | 75 | 2/1 | 150/300 | 2.00/4.00 | 0.1 |

(A): Acrylic-modified polyester resin
(B1): Sugar alcohol
(B2): Sugar alcohol derivative
(D): Inorganic particles
(E): Fluorochemical surfactant

TABLE 8

| | (A) Components | | |
|---|---|---|---|
| | Tg | Acrylic resin component/ Polyester resin component | Alkyl acrylate•Alkyl methacrylate/Epoxy-containing acrylic monomer |
| Example 26 | 97 | 50/50 | 90/10 |
| Example 27 | 97 | 50/50 | 90/10 |
| Example 28 | 97 | 50/50 | 90/10 |
| Example 29 | 97 | 50/50 | 90/10 |
| Example 30 | 97 | 50/50 | 90/10 |
| Example 31 | 97 | 50/50 | 90/10 |
| Example 32 | 97 | 50/50 | 90/10 |
| Example 33 | 97 | 50/50 | 90/10 |
| Example 34 | 97 | 50/50 | 90/10 |
| Example 35 | 97 | 50/50 | 90/10 |
| Example 36 | 97 | 50/50 | 90/10 |
| Example 37 | 97 | 50/50 | 90/10 |
| Example 38 | 97 | 50/50 | 90/10 |
| Example 39 | 97 | 50/50 | 90/10 |
| Example 40 | 97 | 50/50 | 90/10 |
| Example 41 | 97 | 50/50 | 90/10 |
| Example 42 | 97 | 50/50 | 90/10 |
| Example 43 | 97 | 50/50 | 90/10 |
| Example 44 | 97 | 50/50 | 90/10 |
| Example 45 | 97 | 50/50 | 90/10 |
| Example 46 | 97 | 50/50 | 90/10 |

(A): Acrylic-modified polyester resin

TABLE 9

| | Evaluation results | | | | |
|---|---|---|---|---|---|
| | Transmittance (%) | Initial haze (%) | Haze after heat treatment (%) | Δ haze | Heat-treatment evaluation |
| Example 26 | 90.5 | 0.40 | 0.62 | 0.22 | A |
| Example 27 | 90.1 | 0.50 | 0.59 | 0.09 | A |
| Example 28 | 89.9 | 0.89 | 0.98 | 0.09 | A |
| Example 29 | 89.2 | 1.26 | 1.51 | 0.25 | A |
| Example 30 | 90.4 | 0.41 | 0.64 | 0.23 | A |
| Example 31 | 90 | 0.74 | 0.86 | 0.12 | A |
| Example 32 | 89.5 | 1.20 | 1.29 | 0.09 | A |
| Example 33 | 88.8 | 1.65 | 1.9 | 0.25 | A |
| Example 34 | 89.9 | 1.05 | 1.12 | 0.07 | A |
| Example 35 | 89.1 | 1.35 | 1.44 | 0.09 | A |
| Example 36 | 88.7 | 1.85 | 1.96 | 0.11 | A |
| Example 37 | 90.1 | 0.51 | 0.64 | 0.13 | A |
| Example 38 | 90.1 | 0.50 | 0.59 | 0.09 | A |
| Example 39 | 90 | 0.53 | 0.61 | 0.08 | A |
| Example 40 | 90 | 0.62 | 0.72 | 0.1 | A |
| Example 41 | 89.3 | 1.15 | 1.24 | 0.09 | A |
| Example 42 | 89.1 | 1.20 | 1.28 | 0.08 | A |
| Example 43 | 89.5 | 0.57 | 0.75 | 0.18 | A |
| Example 44 | 89.3 | 1.16 | 1.34 | 0.18 | A |
| Example 45 | 89.4 | 0.84 | 1.06 | 0.22 | A |
| Example 46 | 89.2 | 1.27 | 1.51 | 0.24 | A |

TABLE 10

| | Evaluation results | | | |
|---|---|---|---|---|
| | Initial haze (%) | Haze after pressure treatment (%) | Δ haze | Pressure treatment evaluation |
| Example 26 | 0.40 | 0.65 | 0.25 | A |
| Example 27 | 0.50 | 0.65 | 0.15 | A |
| Example 28 | 0.89 | 1.05 | 0.16 | A |
| Example 29 | 1.26 | 1.55 | 0.29 | A |
| Example 30 | 0.41 | 0.67 | 0.26 | A |
| Example 31 | 0.74 | 0.90 | 0.16 | A |
| Example 32 | 1.20 | 1.36 | 0.16 | A |
| Example 33 | 1.65 | 1.92 | 0.27 | A |

TABLE 10-continued

|  | Evaluation results | | | |
|---|---|---|---|---|
|  | Initial haze (%) | Haze after pressure treatment (%) | Δ haze | Pressure treatment evaluation |
| Example 34 | 1.05 | 1.13 | 0.08 | A |
| Example 35 | 1.35 | 1.45 | 0.10 | A |
| Example 36 | 1.85 | 1.96 | 0.11 | A |
| Example 37 | 0.51 | 0.65 | 0.14 | A |
| Example 38 | 0.50 | 0.64 | 0.14 | A |
| Example 39 | 0.53 | 0.64 | 0.11 | A |
| Example 40 | 0.62 | 0.75 | 0.13 | A |
| Example 41 | 1.15 | 1.24 | 0.09 | A |
| Example 42 | 1.20 | 1.28 | 0.08 | A |
| Example 43 | 0.57 | 0.80 | 0.23 | A |
| Example 44 | 1.16 | 1.37 | 0.21 | A |
| Example 45 | 0.84 | 1.11 | 0.27 | A |
| Example 46 | 1.27 | 1.54 | 0.27 | A |

TABLE 11

|  | The mass ratio of (A) to (B1 + B2) | | The amount of (C) based on 100 parts by mass of total of (A + B1 + B2) (parts by mass) | The total content of (A + B1 + B2) based on total resin layer (% by mass) |
|---|---|---|---|---|
|  | (A) | (B1 + B2) | | |
| Example 47 | 97 | 3 | 0 | 98 |
| Example 48 | 95 | 5 | 0 | 98 |
| Example 49 | 93 | 7 | 0 | 98 |
| Example 50 | 90 | 10 | 0 | 98 |
| Example 51 | 85 | 15 | 0 | 98 |
| Example 52 | 75 | 25 | 0 | 98 |
| Example 53 | 90 | 10 | 10 | 89 |
| Example 54 | 90 | 10 | 30 | 76 |
| Example 55 | 90 | 10 | 50 | 66 |
| Example 56 | 90 | 10 | 30 | 76 |
| Example 57 | 90 | 10 | 30 | 76 |
| Example 58 | 90 | 10 | 0 | 98 |
| Example 59 | 90 | 10 | 0 | 98 |
| Comparative Example 1 | 72 | 28 | 0 | 98 |
| Comparative Example 2 | 99 | 1 | 0 | 98 |
| Comparative Example 3 | 72 | 28 | 0 | 98 |
| Comparative Example 4 | 99 | 1 | 0 | 98 |
| Comparative Example 5 | 97 | 3 (*1) | 0 | 98 (*2) |
| Comparative Example 6 | 90 | 10 | 0 | 98 |
| Comparative Example 7 | 100 | 0 | 0 | 98 |
| Comparative Example 8 | 100 | 0 | 0 | 98 |

(A): Acrylic-modified polyester resin
(B1): Sugar alcohol
(B2): Sugar alcohol derivative
(C): Additive comprising oxazoline-based compound and/or carbodiimide-based compound
(*1): The mass ratio of ethylene glycol
(*2): The ratio of the total content of acrylic-modified polyester resin and ethylene glycol

TABLE 12

|  | Resin layer thickness d (nm) | The amount of (D) based on 100 parts by mass of total of (A + B1 + B2) (parts by mass) | The number-average particle size (D) (nm) | (D) number-average particle size/ Resin layer thickness d | The content of (E) based on total resin composition (parts by mass) |
|---|---|---|---|---|---|
| Example 47 | 150 | 2 | 170 | 1.13 | 0.02 |
| Example 48 | 150 | 2 | 170 | 1.13 | 0.02 |
| Example 49 | 150 | 2 | 170 | 1.13 | 0.02 |
| Example 50 | 150 | 2 | 170 | 1.13 | 0.02 |
| Example 51 | 150 | 2 | 170 | 1.13 | 0.02 |
| Example 52 | 150 | 2 | 170 | 1.13 | 0.02 |
| Example 53 | 150 | 2 | 170 | 1.13 | 0.02 |
| Example 54 | 150 | 2 | 170 | 1.13 | 0.02 |
| Example 55 | 150 | 2 | 170 | 1.13 | 0.02 |
| Example 56 | 150 | 2 | 170 | 1.13 | 0.02 |
| Example 57 | 150 | 2 | 170 | 1.13 | 0.02 |
| Example 58 | 150 | 2 | 170 | 1.13 | 0.02 |
| Example 59 | 150 | 2 | 170 | 1.13 | 0.02 |
| Comparative Example 1 | 150 | 2 | 170 | 1.13 | 0.02 |
| Comparative Example 2 | 150 | 2 | 170 | 1.13 | 0.02 |
| Comparative Example 3 | 150 | 2 | 170 | 1.13 | 0.02 |
| Comparative Example 4 | 150 | 2 | 170 | 1.13 | 0.02 |
| Comparative Example 5 | 150 | 2 | 170 | 1.13 | 0.02 |
| Comparative Example 6 | 150 | 2 | 170 | 1.13 | 0.02 |
| Comparative Example 7 | 150 | 2 | 170 | 1.13 | 0.02 |
| Comparative Example 8 | 150 | 2 | 170 | 1.13 | 0.02 |

(A): Acrylic-modified polyester resin
(B1): Sugar alcohol
(B2): Sugar alcohol derivative
(D): Inorganic particles
(E): Fluorochemical surfactant

TABLE 13

| | | (A) Components | |
|---|---|---|---|
| | Tg | Acrylic resin component/ Polyester resin component | Alkyl acrylate·Alkyl methacrylate/ Epoxy-containing acrylic monomer |
| Example 47 | 93 | 50/50 | 85/15 |
| Example 48 | 93 | 50/50 | 85/15 |
| Example 49 | 93 | 50/50 | 85/15 |
| Example 50 | 93 | 50/50 | 85/15 |
| Example 51 | 93 | 50/50 | 85/15 |
| Example 52 | 93 | 50/50 | 85/15 |
| Example 53 | 93 | 50/50 | 85/15 |
| Example 54 | 93 | 50/50 | 85/15 |
| Example 55 | 93 | 50/50 | 85/15 |
| Example 56 | 97 | 50/50 | 90/10 |
| Example 57 | 97 | 50/50 | 90/10 |
| Example 58 | 97 | 50/50 | 90/10 |
| Example 59 | 97 | 50/50 | 90/10 |
| Comparative Example 1 | 77 | 50/50 | 90/10 |
| Comparative Example 2 | 77 | 50/50 | 90/10 |
| Comparative Example 3 | 97 | 50/50 | 90/10 |
| Comparative Example 4 | 97 | 50/50 | 90/10 |
| Comparative Example 5 | 77 | 50/50 | 90/10 |
| Comparative Example 6 | 62 | 50/50 | 90/10 |
| Comparative Example 7 | 97 | 50/50 | 90/10 |
| Comparative Example 8 | 77 | 50/50 | 90/10 |

(A): Acrylic-modified polyester resin

TABLE 14

| | Evaluation results | | | |
|---|---|---|---|---|
| | Transmittance (%) | Initial haze (%) | Haze after heat treatment (%) | Δ haze | Heat-treatment evaluation |
| Example 47 | 90.0 | 1.10 | 1.27 | 0.17 | A |
| Example 48 | 90.0 | 0.60 | 0.76 | 0.16 | A |
| Example 49 | 90.0 | 0.57 | 0.72 | 0.15 | A |
| Example 50 | 90.1 | 0.47 | 0.59 | 0.12 | A |
| Example 51 | 90.1 | 0.44 | 0.61 | 0.17 | A |
| Example 52 | 90.1 | 0.40 | 0.57 | 0.17 | A |
| Example 53 | 90.0 | 0.61 | 0.76 | 0.15 | A |
| Example 54 | 90.0 | 0.80 | 0.95 | 0.15 | A |
| Example 55 | 89.9 | 1.18 | 1.32 | 0.14 | A |
| Example 56 | 89.5 | 0.83 | 0.98 | 0.15 | A |
| Example 57 | 89.6 | 0.78 | 0.9 | 0.12 | A |
| Example 58 | 89.0 | 0.67 | 0.83 | 0.16 | A |
| Example 59 | 89.5 | 0.85 | 0.95 | 0.1 | A |
| Comparative Example 1 | 90.1 | 0.40 | 0.88 | 0.48 | B |
| Comparative Example 2 | 90.0 | 2.10 | 2.42 | 0.32 | B |
| Comparative Example 3 | 89.8 | 0.40 | 0.75 | 0.35 | B |
| Comparative Example 4 | 89.1 | 2.40 | 2.85 | 0.45 | B |
| Comparative Example 5 | 85.5 | 2.75 | 3.30 | 0.55 | C |
| Comparative Example 6 | 90.0 | 0.45 | 0.94 | 0.49 | B |
| Comparative Example 7 | 84.8 | 3.80 | 4.51 | 0.71 | C |
| Comparative Example 8 | 86.3 | 2.40 | 2.92 | 0.52 | C |

TABLE 15

| | Evaluation results | | | |
|---|---|---|---|---|
| | Initial haze (%) | Haze after pressure treatment (%) | Δ haze | Pressure treatment evaluation |
| Example 47 | 1.10 | 1.29 | 0.19 | A |
| Example 48 | 0.60 | 0.78 | 0.18 | A |
| Example 49 | 0.57 | 0.77 | 0.17 | A |
| Example 50 | 0.47 | 0.64 | 0.14 | A |
| Example 51 | 0.44 | 0.59 | 0.19 | A |
| Example 52 | 0.40 | 0.59 | 0.19 | A |
| Example 53 | 0.61 | 0.86 | 0.25 | A |
| Example 54 | 0.80 | 1.07 | 0.27 | A |
| Example 55 | 1.18 | 1.46 | 0.28 | A |
| Example 56 | 0.83 | 1.06 | 0.23 | A |
| Example 57 | 0.78 | 0.97 | 0.19 | A |
| Example 58 | 0.67 | 0.92 | 0.25 | A |
| Example 59 | 0.85 | 0.97 | 0.12 | A |
| Comparative Example 1 | 0.40 | 0.99 | 0.59 | C |
| Comparative Example 2 | 2.10 | 2.65 | 0.55 | C |
| Comparative Example 3 | 0.40 | 0.92 | 0.52 | C |
| Comparative Example 4 | 2.40 | 3.04 | 0.64 | C |
| Comparative Example 5 | 2.75 | 3.45 | 0.70 | C |
| Comparative Example 6 | 0.45 | 1.20 | 0.75 | C |
| Comparative Example 7 | 3.80 | 4.85 | 1.05 | C |
| Comparative Example 8 | 2.40 | 3.27 | 0.87 | C |

INDUSTRIAL APPLICABILITY

We provide a laminated film that is transparent and has an excellent ability to inhibit oligomers due to heat treatment, and the film can be used in optical adhesion films for display application and adhesion films that require various thermal processing.

The invention claimed is:

1. A laminated film comprising a resin layer provided on at least one surface of a thermoplastic resin film substrate, wherein
the resin layer comprises 1) a fluorochemical surfactant in an amount of from 0.01% by mass to 0.30% by mass based on the total mass of a resin composition forming the resin layer, 2) an acrylic-modified polyester whose acrylic resin component has a glass-transition temperature of not lower than 67° C. and 3) a sugar alcohol and/or a sugar alcohol derivative;
a mass ratio of the acrylic-modified polyester to the sugar alcohol and the sugar alcohol derivative (mass of the acrylic-modified polyester/total mass of the sugar alcohol and the sugar alcohol derivative) is from 90/10 to 97/3;
total content of the acrylic-modified polyester, the sugar alcohol, and the sugar alcohol derivative is 65% by mass or more based on the total resin layer; and
haze value of the laminated film is not more than 2.0%.

2. The laminated film according to claim 1, wherein the glass-transition temperature of the acrylic resin component in said acrylic-modified polyester is 93° C. or higher.

3. The laminated film according to claim 1, wherein
the mass ratio of the acrylic resin component to the polyester resin component in said acrylic-modified polyester (the mass of the acrylic resin component/the mass of the polyester resin component) is from 30/70 to 90/10, and the acrylic resin component contain alkyl methacrylate and/or alkyl acrylate in an amount from 50% by mass to 97% by mass based on the total acrylic resin component and epoxy-containing acrylic monomer in an amount from 3% by mass to 50% by mass based on the total acrylic resin component.

4. The laminated film according to claim 1, wherein said resin layer comprises inorganic particles, and taking thickness of the resin layer as d, a highest peak among the peaks in particle-size distribution of the inorganic particles is in a range of particle size 1.05 d to 4.50 d.

5. The laminated film according to claim 4, wherein at least one peak other than the highest peak among the peaks in particle-size distribution of said inorganic particles is in a range of particle size 1.05 d to 4.50 d.

6. The laminated film according to claim 1, wherein said acrylic-modified polyester is cross-linked by at least one compound (C) selected from the group consisting of an oxazoline-based compound, a carbodiimide-based compound, an epoxy-based compound, and a melamine-based compound.

7. A method of producing a laminated film comprising:

applying a resin composition onto at least one surface of a thermoplastic resin film before completion of crystal orientation, followed by drying;

drawing said thermoplastic resin film at least in an axial direction; and then subjecting said thermoplastic resin film to a heat treatment to complete crystal orientation of the thermoplastic resin film, wherein said resin composition comprises 1) a fluorochemical surfactant in an amount of from 0.01% by mass to 0.30% by mass based on the total mass of a resin composition forming the resin layer, 2) an acrylic-modified polyester whose acrylic resin component has a glass-transition temperature of not lower than 67° C. and 3) a sugar alcohol and/or derivative thereof; mass ratio of the acrylic-modified polyester to the sugar alcohol and the sugar alcohol derivative (mass of the acrylic-modified polyester/total mass of the sugar alcohol and the sugar alcohol derivative) is from 90/10 to 97/3; and total content of the acrylic-modified polyester, the sugar alcohol, and the sugar alcohol derivative is 65% by mass or more based on the solid content of the resin composition, and said heat treatment temperature is a temperature lower than the boiling points of said sugar alcohol and said sugar alcohol derivative.

8. The laminated film according to claim 2, wherein the mass ratio of the acrylic resin component to the polyester resin component in said acrylic-modified polyester (the mass of the acrylic resin component/the mass of the polyester resin component) is from 30/70 to 90/10, and the acrylic resin component contain alkyl methacrylate and/or alkyl acrylate in an amount from 50% by mass to 97% by mass based on the total acrylic resin component and epoxy-containing acrylic monomer in an amount from 3% by mass to 50% by mass based on the total acrylic resin component.

9. The laminated film according to claim 2, wherein said resin layer comprises inorganic particles, and taking thickness of the resin layer as d, a highest peak among the peaks in particle-size distribution of the inorganic particles is in a range of particle size 1.05 d to 4.50 d.

10. The laminated film according to claim 3, wherein said resin layer comprises inorganic particles, and taking thickness of the resin layer as d, a highest peak among the peaks in particle-size distribution of the inorganic particles is in a range of particle size 1.05 d to 4.50 d.

11. The laminated film according to claim 1, wherein said resin layer comprises inorganic particles in an amount of from 0.2% by mass to 4.0% by mass based on the total mass of the resin layer.

* * * * *

UNITED STATES PATENT AND TRADEMARK OFFICE
CERTIFICATE OF CORRECTION

Page 1 of 1

PATENT NO.         : 9,200,126 B2
APPLICATION NO.    : 13/636871
DATED              : December 1, 2015
INVENTOR(S)        : Kozuyoshi Ota et al.

It is certified that error appears in the above-identified patent and that said Letters Patent is hereby corrected as shown below:

Specification

In column 2

At line 56, please change "Δ" to -- A --.

In column 16

At line 35, please change "(A)" to -- (Δ) --.

In column 24

At line 62, please change "A" to -- Δ --.

Signed and Sealed this
Twenty-sixth Day of July, 2016

Michelle K. Lee
*Director of the United States Patent and Trademark Office*